(12) United States Patent
Shull et al.

(10) Patent No.: US 7,493,403 B2
(45) Date of Patent: Feb. 17, 2009

(54) DOMAIN NAME OWNERSHIP VALIDATION

(75) Inventors: Mark Shull, Chevy Chase, MD (US);
Ihab Shraim, Germantown, MD (US);
David Silver, Sparks, NV (US); Allen Enfant Chen, Germantown, MD (US);
Elisa Cooper, Boise, ID (US)

(73) Assignee: Markmonitor Inc., Boise, ID (US)

( * ) Notice: Subject to any disclaimer, the term of this patent is extended or adjusted under 35 U.S.C. 154(b) by 0 days.

(21) Appl. No.: 11/685,311

(22) Filed: Mar. 13, 2007

(65) Prior Publication Data

US 2008/0034211 A1    Feb. 7, 2008

Related U.S. Application Data

(60) Provisional application No. 60/782,027, filed on Mar. 13, 2006.

(51) Int. Cl.
*G06F 15/16* (2006.01)
(52) U.S. Cl. .................. 709/229; 709/245
(58) Field of Classification Search .......... 709/245, 709/229, 223; 715/500; 345/738; 707/3, 707/102
See application file for complete search history.

(56) References Cited

U.S. PATENT DOCUMENTS

| | | | |
|---|---|---|---|
| 4,972,349 A | 11/1990 | Kleinberger |
| 5,062,074 A | 10/1991 | Kleinberger |
| 5,542,087 A | 7/1996 | Neimat et al. |
| 5,764,906 A | 6/1998 | Edelstein et al. |
| 5,819,271 A | 10/1998 | Mahoney et al. |
| 5,842,206 A | 11/1998 | Sotomayor |
| 5,848,410 A | 12/1998 | Walls et al. |
| 5,864,676 A | 1/1999 | Beer et al. |
| 5,864,845 A | 1/1999 | Voorhees et al. |
| 5,881,131 A | 3/1999 | Farris et al. |
| 5,898,836 A | 4/1999 | Freivald et al. |
| 5,903,861 A | 5/1999 | Chan |
| 5,913,215 A | 6/1999 | Rubinstein et al. |
| 5,950,173 A | 9/1999 | Perkowski |
| 5,999,940 A | 12/1999 | Ranger |
| 6,009,459 A | 12/1999 | Belfiore et al. |
| 6,029,175 A | 2/2000 | Chow et al. |
| 6,029,192 A | 2/2000 | Hill et al. |
| 6,041,326 A | 3/2000 | Amro et al. |
| 6,092,074 A | 7/2000 | Rodkin et al. |
| 6,119,124 A | 9/2000 | Broder et al. |

(Continued)

OTHER PUBLICATIONS

Adelman et al, U.S. Appl. No. 10/977,373, Oct. 29, 2004.*

(Continued)

*Primary Examiner*—Jungwon Chang
(74) *Attorney, Agent, or Firm*—Townsend and Toswnsend and Crew, LLP

(57) ABSTRACT

Embodiments of the invention provide systems and methods for validating ownership of a domain name. According to one embodiment, a validating ownership of a domain name can comprise retrieving one or more domain name ownership records. For example, the one or more domain name ownership records comprise Who Is records. Validity of the one or more domain name records can be confirmed with a designated domain manager. According to one embodiment, confirming validity of the one or more domain name records with the designated domain manager can comprise authenticating the designated domain manager based on a certificate provided by the designated domain manager.

31 Claims, 8 Drawing Sheets

U.S. PATENT DOCUMENTS

| | | | |
|---|---|---|---|
| 6,141,653 | A | 10/2000 | Conklin et al. |
| 6,144,962 | A | 11/2000 | Weinberg et al. |
| 6,148,289 | A | 11/2000 | Virdy |
| 6,151,624 | A | 11/2000 | Teare et al. |
| 6,154,738 | A | 11/2000 | Call |
| 6,161,130 | A | 12/2000 | Horvitz et al. |
| 6,175,830 | B1 | 1/2001 | Maynard |
| 6,230,168 | B1 | 5/2001 | Unger et al. |
| 6,237,144 | B1 | 5/2001 | Delo |
| 6,256,623 | B1 | 7/2001 | Jones |
| 6,266,668 | B1 | 7/2001 | Vanderveldt et al. |
| 6,282,549 | B1 | 8/2001 | Hoffert et al. |
| 6,298,341 | B1 | 10/2001 | Mann et al. |
| 6,311,182 | B1 | 10/2001 | Colbath et al. |
| 6,338,082 | B1 | 1/2002 | Schneider |
| 6,385,615 | B1 | 5/2002 | Haeri et al. |
| 6,389,458 | B2 | 5/2002 | Shuster |
| 6,392,668 | B1 | 5/2002 | Murray |
| 6,401,118 | B1 | 6/2002 | Thomas |
| 6,412,014 | B1 | 6/2002 | Ryan |
| 6,421,733 | B1 | 7/2002 | Tso et al. |
| 6,442,523 | B1 | 8/2002 | Siegel |
| 6,487,553 | B1 | 11/2002 | Emens et al. |
| 6,516,312 | B1 | 2/2003 | Kraft et al. |
| 6,564,253 | B1 | 5/2003 | Stebbings |
| 6,611,830 | B2 | 8/2003 | Shinoda et al. |
| 6,629,092 | B1 | 9/2003 | Berke |
| 6,631,357 | B1 | 10/2003 | Perkowski |
| 6,643,641 | B1 | 11/2003 | Snyder |
| 6,654,751 | B1 | 11/2003 | Schmugar et al. |
| 6,704,722 | B2 | 3/2004 | Wang Baldonado |
| 6,751,606 | B1 | 6/2004 | Fries et al. |
| 6,760,746 | B1 | 7/2004 | Schneider |
| 6,880,007 | B1 | 4/2005 | Gardos et al. |
| 6,895,430 | B1 | 5/2005 | Schneider |
| 7,194,552 | B1 | 3/2007 | Schneider |
| 7,346,605 | B1 | 3/2008 | Hapworth |
| 2001/0047407 | A1 | 11/2001 | Moore et al. |
| 2001/0049747 | A1* | 12/2001 | Stanbach ............... 709/245 |
| 2002/0026439 | A1* | 2/2002 | Monroe .................. 707/3 |
| 2002/0099693 | A1 | 7/2002 | Kofsky |
| 2002/0129013 | A1 | 9/2002 | Thomas |
| 2002/0147724 | A1 | 10/2002 | Fries et al. |
| 2002/0147880 | A1 | 10/2002 | Baldonado |
| 2002/0156774 | A1 | 10/2002 | Beauregard et al. |
| 2002/0174132 | A1 | 11/2002 | Silverman |
| 2002/0194116 | A1 | 12/2002 | Coakley |
| 2004/0019535 | A1 | 1/2004 | Perkowski |
| 2004/0054917 | A1 | 3/2004 | Obrecht et al. |
| 2004/0064561 | A1 | 4/2004 | Parsons et al. |
| 2004/0064736 | A1 | 4/2004 | Obrecht et al. |
| 2004/0098607 | A1 | 5/2004 | Alagna et al. |
| 2004/0123157 | A1 | 6/2004 | Alagna et al. |
| 2004/0169678 | A1* | 9/2004 | Oliver ........................ 345/738 |
| 2004/0187023 | A1 | 9/2004 | Alagna et al. |
| 2004/0220903 | A1 | 11/2004 | Shah et al. |
| 2004/0230449 | A1 | 11/2004 | Franks |
| 2004/0254848 | A1 | 12/2004 | Golan et al. |
| 2005/0004889 | A1 | 1/2005 | Bailey et al. |
| 2005/0004897 | A1 | 1/2005 | Lipson et al. |
| 2005/0060263 | A1 | 3/2005 | Golan et al. |
| 2005/0071741 | A1* | 3/2005 | Acharya et al. ............. 715/500 |
| 2005/0097320 | A1 | 5/2005 | Golan et al. |
| 2005/0172031 | A1* | 8/2005 | Adelman .................... 709/245 |
| 2005/0289140 | A1 | 12/2005 | Ford et al. |
| 2006/0011716 | A1 | 1/2006 | Perkowski |
| 2006/0059166 | A1 | 3/2006 | Sieffert et al. |
| 2006/0271668 | A1* | 11/2006 | Parsons et al. .............. 709/223 |
| 2007/0208869 | A1* | 9/2007 | Adelman et al. ............ 709/229 |
| 2008/0010365 | A1 | 1/2008 | Schneider |

OTHER PUBLICATIONS

Author Unknown, The Unfair Advantage Book on Winning The Search Engine Wars, Planet Ocean Communications, May 1, 1999, version SE32, 100 pages.

Davis III, G. Gervaise, "Internet Domain Names And Trademarks: Agrowing Area of Domestic and International Disputes", G. Gervais Davis III, Esq. Chapter Eleven, 1997-98, pp. 1-24.

Dreilinger et al., "Experiences with Selecting Search Engines Using Metasearch", ACM Press, ACM Transactions on Information Systems (TOIS), vol. 15, Issue 3, Jul. 1997 (pp. 195-222).

Eakins, J. P. et al., "Retrieval Of Trade Mark Images By Shape Feature—The Artisan Project," IEEE, pp. 9/1-9/6, 1995.

Eakins, John P. et al., "Similarilty Retrieval Of Trademark Images," IEEE, pp. 53-63, Apr.-Jun. 1998.

Intellectual Property Network, Query is (search engine), IBM, printed date May 27, 1999, 4 pages.

Kuester, J, et al., "Hyperlinks, Frames and Meta-Tags: An Intellectual Property Analysis", IDEA: The Journal of Law and Technology 1998, 38 IDEA 243, 29 pages.

MarkMonitor, Inc., "Domain Name Tools," https://www.markmonitor.com/ip/tmsmart_input.asp?sid= 71420003022810493766646, 1 page, 2003.

MarkMonitor, Inc., "Steps For Conducting A TMIQ Search," https://www.markmonitor.com/ip/help_tmiq.asp?sid=71420003022810493766646, 1 page, 2003.

Meeks, Brock N., "Scam diverts surfers to porn sites", MSNBC, May 18, 1999, 5 pages.

Sandburg, Brenda, "Do WIPO Trademark Rules Go Far Enough?", NLP IP Company, Tuesday, May 4, 1999, 3 pages.

Suda, P. et al., "Logo And Word Matching Using A General Approach To Signal Registration," IEEE, pp. 61-65, 1997.

* cited by examiner

DOMAIN NAME OWNERSHIP VALIDATION

CROSS-REFERENCES TO RELATED APPLICATIONS

This application claims the benefit of U.S. Provisional Application No. 60/782,027, filed Mar. 13, 2006 by Shull and entitled "Domain Name Ownership Validation," the entire disclosure of which is incorporated herein by reference.

This application is also related to the following commonly-owned, co-pending applications (the "Related Applications"), of which the entire disclosure of each is incorporated herein by reference, as if set forth in full in this document, for all purposes:

U.S. patent application Ser. No. 10/709,398, filed May 2, 2004, by Shraim et al. and entitled "Online Fraud Solution"; U.S. Provisional Application No. 60/615,973, filed Oct. 4, 2004, by Shraim et al. and entitled "Online Fraud Solution"; U.S. Provisional Application No. 60/610,714, filed Sep. 17, 2004, by Shull and entitled "Methods and Systems For Preventing Online Fraud"; U.S. Provisional Application No. 60/610,715, filed Sep. 17, 2004, by Shull and entitled "Customer-Based Detection Of Online Fraud"; U.S. patent application Ser. No. 10/996,991, filed Nov. 23, 2004, by Shraim et al. and entitled "Online Fraud Solution"; U.S. patent application Ser. No. 10/996,567, filed Nov. 23, 2004, by Shull et al. and entitled "Enhanced Responses To Online Fraud"; U.S. patent application Ser. No. 10/996,990, filed Nov. 23, 2004, by Shull et al. and entitled "Customer-Based Detection Of Online Fraud"; U.S. patent application Ser. No. 10/996,566, filed Nov. 23, 2004, by Shull et al. and entitled "Early Detection Of Online Fraud"; U.S. patent application Ser. No. 10/996,646, filed Nov. 23, 2004, by Shull et al. and entitled "Enhanced Responses To Online Fraud"; U.S. patent application Ser. No. 10/996,568, filed Nov. 23, 2004, by Shull et al. and entitled "Generating Phish Messages"; U.S. patent application Ser. No. 10/997,626, filed Nov. 23, 2004, now U.S. Pat. No. 7,457,823 by Shull et al. and entitled "Methods and Systems For Analyzing Data Related To Possible Online Fraud"; U.S. patent application Ser. No. 11/237,642, filed Sep. 27, 2005, by Shull et al. and entitled "Platform-Independent Fraud Detection System and Methods"; U.S. Provisional Application No. 60/658,124, filed Mar. 2, 2005, by Shull et al. and entitled "Distribution Of Trust Data"; U.S. Provisional Application No. 60/658,087, filed Mar. 2, 2005, by Shull et al. and entitled "Trust Evaluation System and Methods"; U.S. Provisional Application No. 60/658,281, filed Mar. 2, 2005, by Shull et al. and entitled "Implementing Trust Policies"; U.S. patent applications Ser. No. 11/368,255, filed Mar. 2, 2006 by Shull et. al. and entitled "Distribution of Trust Data"; U.S. patent applications Ser. No. 11/368,329, filed Mar. 2, 2006 by Shull et. al. and entitled "Implementing Trust Policies"; U.S. patent applications Ser. No. 11/368,372, filed Mar. 2, 2006 by Shull et. al. and entitled "Trust Evaluation System and Methods"; U.S. Provisional Application No. 60/727,891 filed Oct. 17, 2005 by Silver and entitled "Client-Side Brand Protection"; U.S. Provisional Application No. 60/727,676 filed Oct. 17, 2005 by Shull and entitled "B2C Authentication Systems"; U.S. patent applications Ser. No. 11/550,219, filed Oct. 17, 2006 by Silver and entitled "Client-Side Brand Protection"; U.S. patent applications Ser. No. 11/550,142, filed Oct. 17, 2006 by Shull and entitled "B2C Authentication"; U.S. patent applications Ser. No. 11/550,173, filed Oct. 17, 2006 by Shull and entitled "B2C Authentication Systems and Methods"; and U.S. patent applications Ser. No. 11/539,357, filed Oct. 6, 2006 by Mather and entitled "Browser Reputation Indicators with Two-Way Authentication."

BACKGROUND OF THE INVENTION

Embodiments of the present invention relate generally to preventing online fraud. More specifically, embodiments of the present invention relate to methods and systems for validating ownership of domain names.

Today, banks and/or other entities are trying to find ways to extend strong enterprise-to-enterprise (also known as business-to-business) authentication schemes to consumers to enable consumers to know if they are actually connected to the legitimate bank and/or entity they believe they are connected to. These business-to-consumer or B2C approaches are complex, expensive and/or require considerable consumer understanding, compliance and patience.

One of the biggest challenges facing corporations and others entities trying to use the Internet for business and/or other legitimate purposes today is that it is very easy for a fraudster or bad actor to buy and use an Internet domain name or IP address that would appear to belong to the legitimate entity and that the fraudster promotes as belonging to the legitimate entity. The fraudster may use the similar domain name or IP address to deceive, confuse, scare or entice a consumer, customer or partner of the company or entity as part of an actual or attempted fraud, fake transaction, counterfeit sale, false association or other identity based crime or other abuse.

As a result of these scams, consumers and partners are losing trust in and are becoming less willing to use the Internet, online commerce or self-service systems, email, and/or other Internet based services to interact with and transact business with the entity. This causes harm to the entity such as lost revenue due to lower sales and/or increased operations costs as consumers and others become reluctant to use online services such as online banking, online account management, ecommerce, shopping, travel planning, etc.

In response to this, corporations, regulators and others are actively discussing multiple enhanced authentication solutions, such as enhanced authentication for online banking and other types of business to consumer (B2C) commerce and/or services. However, traditional authentication solutions are very costly or impractical, if not impossible to implement globally, across a large consumer population.

Domain Names were designed as the Internet's UI to communicate identity and ownership, in order to enable people to link to a corporation's or entity's Internet presence whose names are well known or memorable to them. Consumers intuitively understand that the domain name Microsoft.com (or dot other TLD) is the well known company Microsoft. And, if they know how to look up the domain name ownership whois record, they can read (increasingly in multiple languages) that is the well know company whose address is Redmond Wash.

In many ways, Domain Names have always been a better and more understandable means of communicating ownership and authenticity to consumers, than certificates, except for two things: First, ICANN requires domain name ownership records to be accurate but does not (and cannot) enforce this. And, second, prior to the URS and IE7, there has no secure and practical way to communicate them to consumers. Hence, there is a need in the art for improved methods and systems for validating ownership of domain names.

BRIEF SUMMARY OF THE INVENTION

Embodiments of the invention provide systems and methods for validating ownership of a domain name. According to one embodiment, a method for validating ownership of a domain name can comprise retrieving one or more domain name ownership records. For example, the one or more domain name ownership records comprise Who Is records. Validity of the one or more domain name records can be confirmed with a designated domain manager. According to one embodiment, confirming validity of the one or more domain name records with the designated domain manager can comprise authenticating the designated domain manager based on a certificate provided by the designated domain manager.

In response to confirming validity of the one or more domain name records, marking the domain as valid. In response to not confirming validity of the one or more domain name records, marking the domain as invalid. The one or more domain name ownership records can be monitored to detect a change in the one or more domain name ownership records. In response to detecting the change in the one or more domain name ownership records, ownership of the domain name can be re-validated.

In some cases, prior to confirming validity of the one or more domain name ownership records, a determination can be made as to whether the one or more domain name ownership records are substantially complete. In such a case, confirming validity of the one or more domain name records can be performed in response to determining the one or more domain name ownership records are complete. In response to determining the one or more domain name ownership records are not complete, the domain may be marked as not valid.

Other embodiments are directed to computer readable media including code for causing a processor to perform the above method, as well as systems that can perform the above-described method and other methods.

DETAILED DESCRIPTION OF THE INVENTION

Figure 1A:
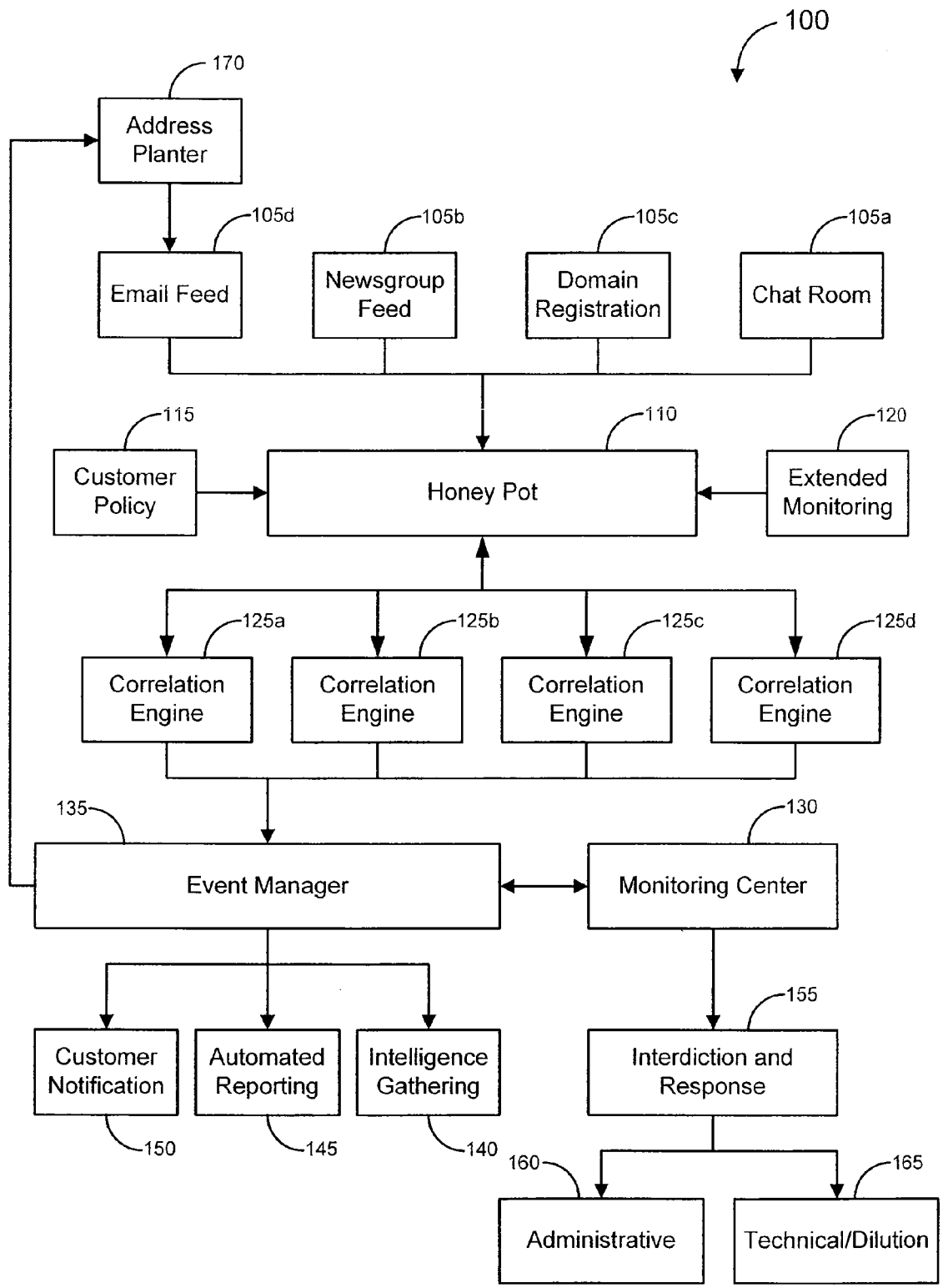
FIG. 1A is a functional diagram illustrating a system for combating online fraud, in accordance with various embodiments of the invention.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Generally speaking, embodiments of the invention (including without limitation, validation models, systems, methods and/or software) provide authentication of a validated website. Merely by way of example, some embodiments may be configured to ensure that a user of a client using a browser can know, simply and with a high or acceptable degree of reliability that the web site or server (and more specifically, the domain name or IP address) they are interacting with is the domain name or IP address that it says it is, and that the domain name or IP addresses are owned by the legitimate entity commonly and/or legally associated with the domain name or IP address. In other words, as a hypothetical example, if a user of a browser enters or clicks on the URL, www.bofa.com, authentication provides a means for them to know that the site is Bank of America, or alternatively, if they type www.bankofammerica.com, they may be warned that this is not Bank of America, for various reasons such as it is a defensive registration owned by Bank of America and/or because the similar domain name is not owned by Bank of America or is registered to someone else.

The terms validation and verification, as used herein when referring to a domain name, refer to processes and systems for determining whether a domain name or website is legitimately registered to the entity with which it is commonly and/or legally associated. For example, validation or verification of the domain name www.bankofamerica.com would determine whether that domain name is actually registered to Bank of America. The term authentication as used herein refers to the processes and systems for providing information regarding the legitimacy of a website or domain name to a user or client upon request. As will be seen, this information can be based on reputation and/or validation of a registered domain name. Embodiments of this validation process used in conjunction with authentication processes and systems as described herein and in the Related Applications, can help build or restore the confidence and trust of consumers and other Internet users in using online commerce or self-service systems because it addresses their desire to know for sure that the site they think they are going to is in fact associated with the expected entity.

Merely by way of example, in some embodiments, the Universal Reputation Service (URS) model can be used with some modifications in a novel way, and in conjunction with enhanced verification of domain name or IP address ownership as part of the registration process, to provide a certificateless form of authentication. Other embodiments may be used to enable or inform reputation enabled applications, particularly, for example, in cases in which a set of reputation data is created and/or associated with a domain name or IP address, perhaps as an integral part of a domain name or IP address registration ad life-cycle management process.

According to one embodiment, a process can be set up to validate the accuracy of ICANN (Internet Corporation for Assigned Names and Numbers) mandated ownership records for specific domain names and to make this validated ownership data available securely within the IE 7 browser in much the same way the IE 7 browser supports the presentation of certificate ownership information.

Domain names are more centric and scalable in representing and communicating "ownership, identity and authenticity" (hereafter "ownership") in terms of human cognition, their link to legal ownership rights globally and their long-lived reputations than SSL certificates, which were designed more as a means to secure and authenticate communications between endpoints in the Internet. This "validated" domain names approach enables consumers to determine ownership information for HTTP sessions, which represent the vast majority of web pages and almost all landing pages where credential input fields are found (and potentially stolen). Consumers would be far better protected and confident in using the Internet if they could know domain ownership first and then, based on this knowledge, decide whether to join an SSL enabled "web of trust" (rather than a certificate only model which tells consumers they should join the "web of trust" first—often in conjunction with submitting credential information—and only then determine who owns it and if they should trust it). This approach would enable IP rights owners to delegate use of these rights to third parties, such as distributors or resellers, to use their names, logos and other well marketed and commonly understood identifiers, in a much simpler fashion than having to include rights recipients in a large number of complex certificate hierarchies. "Validated" domain names, as a category within a larger Domain Name reputation data base, ultimately can be consumed by other core Internet systems, such as Spam Filters and Search Engines to bias their results favorably or unfavorably.

In accordance with various embodiments, systems, methods and software are provided for combating online fraud, and specifically "phishing" operations. An exemplary phishing operation, known as a "spoofing" scam, uses "spoofed" email messages to induce unsuspecting consumers into accessing an illicit web site and providing personal information to a server believed to be operated by a trusted affiliate (such as a bank, online retailer, etc.), when in fact the server is operated by another party masquerading as the trusted affiliate in order to gain access to the consumers' personal information. As used herein, the term "personal information" should be understood to include any information that could be used to identify a person and/or normally would be revealed by that person only to a relatively trusted entity. Merely by way of example, personal information can include, without limitation, a financial institution account number, credit card number, expiration date and/or security code (sometimes referred to in the art as a "Card Verification Number," "Card Verification Value," "Card Verification Code" or "CVV"), and/or other financial information; a userid, password, mother's maiden name, and/or other security information; a full name, address, phone number, social security number, driver's license number, and/or other identifying information.

Embodiments of the present invention provide authentication of a web site that, according to one embodiment, may be based in whole or in part on a reputation of that web page. Such reputation may be determined based on information from a fraud monitoring service such as described in the Related Applications referenced above. A summary of such a system is presented herein for convenience. However, it should be noted that the discussion of this system is provided only to facilitate an understanding of one possible implementation and various embodiments are not limited to use with such a system.

FIG. 1A illustrates the functional elements of an exemplary system 100 that can be used to combat online fraud in accordance with some of these embodiments and provides a general overview of how certain embodiments can operate. (Various embodiments will be discussed in additional detail below). It should be noted that the functional architecture depicted by FIG. 1A and the procedures described with respect to each functional component are provided for purposes of illustration only, and that embodiments of the invention are not necessarily limited to a particular functional or structural architecture; the various procedures discussed herein may be performed in any suitable framework.

In many cases, the system 100 of FIG. 1A may be operated by a fraud prevention service, security service, etc. (referred to herein as a "fraud prevention provider") for one or more customers. Often, the customers will be entities with products, brands and/or web sites that risk being imitated, counterfeited and/or spoofed, such as online merchants, financial institutions, businesses, etc. In other cases, however, the fraud prevention provider may be an employee of the customer and/or an entity affiliated with and/or incorporated within the customer, such as the customer's security department, information services department, etc.

In accordance with some embodiments, of the invention, the system 100 can include (and/or have access to) a variety of data sources 105. Although the data sources 105 are depicted, for ease of illustration, as part of system 100, those skilled in the art will appreciate, based on the disclosure herein, that the data sources 105 often are maintained independently by third parties and/or may be accessed by the system 100. In some cases, certain of the data sources 105 may be mirrored and/or copied locally (as appropriate), e.g., for easier access by the system 100.

The data sources 105 can comprise any source from which data about a possible online fraud may be obtained, including, without limitation, one or more chat rooms 105a, newsgroup feeds 105b, domain registration files 105c, and/or email feeds 105d. The system 100 can use information obtained from any of the data sources 105 to detect an instance of online fraud and/or to enhance the efficiency and/or effectiveness of the fraud prevention methodology discussed herein. In some cases, the system 100 (and/or components thereof) can be configured to "crawl" (e.g., to automatically access and/or download information from) various data sources 105 to find pertinent information, perhaps on a scheduled basis (e.g., once every 10 minutes, once per day, once per week, etc.).

Merely by way of example, there are several newsgroups commonly used to discuss new spamming/spoofing schemes, as well as to trade lists of harvested email addresses. There are also anti-abuse newsgroups that track such schemes. The system 100 may be configured to crawl any applicable newsgroup(s) 105b to find information about new spoof scams, new lists of harvested addresses, new sources for harvested addresses, etc. In some cases, the system 100 may be configured to search for specified keywords (such as "phish," "spoof," etc.) in such crawling. In other cases, newsgroups may be scanned for URLs, which may be download (or copied) and subjected to further analysis, for instance, as described in detail below. In addition, as noted above, there may be one or more anti-abuse groups that can be monitored. Such anti-abuse newsgroups often list new scams that have been discovered and/or provide URLs for such scams. Thus, such anti-abuse groups may be monitored/crawled, e.g., in the way described above, to find relevant information, which may then be subjected to further analysis. Any other data source (including, for example, web pages and/or entire web sites, email messages, etc.) may be crawled and/or searched in a similar manner.

As another example, online chat rooms (including without limitation, Internet Relay Chat ("IRC") channels, chat rooms maintained/hosted by various ISPs, such as Yahoo, America Online, etc., and/or the like) (e.g., 105a) may be monitored (and/or logs from such chat rooms may be crawled) for pertinent information. In some cases, an automated process (known in the art as a "bot") may be used for this purpose. In other cases, however, a human attendant may monitor such chat rooms personally. Those skilled in the art will appreciate that often such chat rooms require participation to maintain access privileges. In some cases, therefore, either a bot or a human attendant may post entries to such chat rooms in order to be seen as a contributor.

Domain registration zone files 105c (and/or any other sources of domain and/or network information, such as Internet registry e.g., ARIN) may also be used as data sources. As those skilled in the art will appreciate, zone files are updated periodically (e.g., hourly or daily) to reflect new domain registrations. These files may be crawled/scanned periodically to look for new domain registrations. In particular embodiments, a zone file 105c may be scanned for registrations similar to a customer's name and/or domain. Merely by way of example, the system 100 can be configured to search for similar domains registered with a different top level domain ("TLD") or global top level domain ("gTLD"), and/or domains with similar spellings. Thus, if a customer uses the <acmeproducts.com> domain, the registration of <acmeproducts.biz>, <acmeproducts.co.uk>, and/or <acmeproduct.com> might be of interest as potential hosts for spoof sites, and domain registrations for such domains could be downloaded and/or noted, for further analysis of the domains to which the registrations correspond. In some embodiments, if a suspicious domain is found, that domain may be placed on a monitoring list. Domains on the monitoring list may be monitored periodically, as described in further detail below, to determine whether the domain has become "live" (e.g., whether there is an accessible web page associated with the domain).

Figure 1B:
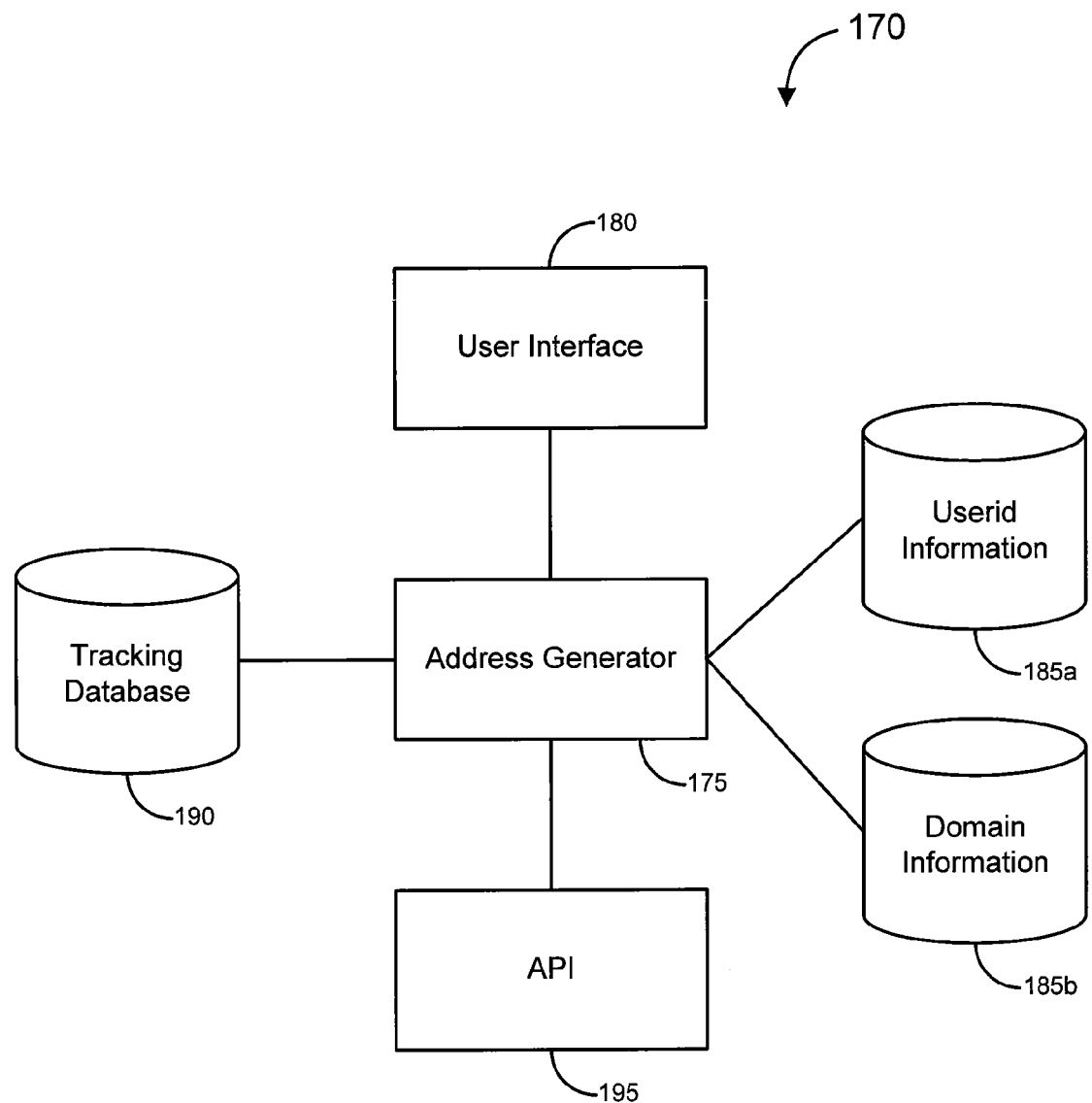
FIG. 1B is a functional diagram illustrating a system for planting bait email addresses, in accordance with various embodiments of the invention.

One or more email feeds 105d can provide additional data sources for the system 100. An email feed can be any source of email messages, including spam messages, as described above. (Indeed, a single incoming email message may be considered an email feed in accordance with some embodiments.) In some cases, for instance as described in more detail below, bait email addresses may be "seeded" or planted by embodiments of the invention, and/or these planted addresses can provide a source of email (i.e., an email feed). The system 100, therefore, can include an address planter 170, which is shown in detail with respect to FIG. 1B.

The address planter 170 can include an email address generator 175. The address generator 175 can be in communication with a user interface 180 and/or one or more databases 185 (each of which may comprise a relational database and/or any other suitable storage mechanism). One such data store may comprise a database of userid information 185a. The userid information 185a can include a list of names, numbers and/or other identifiers that can be used to generate userids in accordance with embodiments of the invention. In some cases, the userid information 185a may be categorized (e.g., into first names, last names, modifiers, such as numbers or other characters, etc.). Another data store may comprise domain information 180. The database of domain information 180 may include a list of domains available for addresses. In many cases, these domains will be domains that are owned/managed by the operator of the address planter 170. In other cases, however, the domains might be managed by others, such as commercial and/or consumer ISPs, etc.

The address generator 175 comprises an address generation engine, which can be configured to generate (on an individual and/or batch basis) email addresses that can be planted at appropriate locations on the Internet (or elsewhere). Merely by way of example, the address generator 175 may be configured to select one or more elements of userid information from the userid data store 185a (and/or to combine a plurality of such elements), and append to those elements a domain selected from the domain data store 185b, thereby creating an email address. The procedure for combining these components is discretionary. Merely by way of example, in some embodiments, the address generator 175 can be configured to prioritize certain domain names, such that relatively more addresses will be generated for those domains. In other embodiments, the process might comprise a random selection of one or more address components.

Some embodiments of the address planter 170 include a tracking database 190, which can be used to track planting operations, including without limitation the location (e.g., web site, etc.) at which a particular address is planted, the date/time of the planting, as well as any other pertinent detail about the planting. Merely by way of example, if an address is planted by subscribing to a mailing list with a given address, the mailing list (as well, perhaps, as the web site, list maintainer's email address, etc.) can be documented in the tracking database. In some cases, the tracking of this information can be automated (e.g., if the address planter's 170 user interface 180 includes a web browser and/or email client, and that web browser/email client is used to plant the address, information about the planting information may be automatically registered by the address planter 170). Alternatively, a user may plant an address manually (e.g., using her own web browser, email client, etc.), and therefore may add pertinent information to the tracking database via a dedicated input window, web browser, etc.

In one set of embodiments, therefore, the address planter 170 may be used to generate an email address, plant an email address (whether or not generated by the address planter 170) in a specified location and/or track information about the planting operation. In particular embodiments, the address planter 170 may also include one or more application programming interfaces ("API") 195, which can allow other components of the system 100 of FIG. 1 (or any other appropriate system) to interact programmatically with the address planter. Merely by way of example, in some embodiments, an API 195 can allow the address planter 170 to interface with a web browser, email client, etc. to perform planting operations. (In other embodiments, as described above, such functionality may be included in the address planter 170 itself).

A particular use of the API 195 in certain embodiments is to allow other system components (including, in particular, the event manager 135) to obtain and/or update information about address planting operations (and/or their results). (In some cases, programmatic access to the address planter 170 may not be needed—the necessary components of the system 100 can merely have access—via SQL, etc.—one or more of the data stores 185, as needed.) Merely by way of example, if an email message is analyzed by the system 100 (e.g., as described in detail below), the system 100 may interrogate the address planter 170 and/or one or more of the data stores 185 to determine whether the email message was addressed to an address planted by the address planter 170. If so, the address planter 170 (or some other component of the system 100, such as the event manager 135), may note the planting location as a location likely to provoke phish messages, so that additional addresses may be planted in such a location, as desired. In this way, the system 100 can implement a feedback loop to enhance the efficiency of planting operations. (Note that this feedback process can be implemented for any desired type of "unsolicited" message, including without limitation phish messages, generic spam messages, messages evidencing trademark misuse, etc.).

Other email feeds are described elsewhere herein, and they can include (but are not limited to), messages received directly from spammers/phishers; email forwarded from users, ISPs and/or any other source (based, perhaps, on a suspicion that the email is a spam and/or phish); email forwarded from mailing lists (including without limitation anti-abuse mailing lists), etc. When an email message (which might be a spam message) is received by the system 100, that message can be analyzed to determine whether it is part of a phishing/spoofing scheme. The analysis of information received from any of these data feeds is described in further detail below, and it often includes an evaluation of whether a web site (often referenced by a URL or other information received/downloaded from a data source 105) is likely to be engaged in a phishing and/or spoofing scam.

Any email message incoming to the system can be analyzed according to various methods of the invention. As those skilled in the art will appreciate, there is a vast quantity of unsolicited email traffic on the Internet, and many of those messages may be of interest in the online fraud context. Merely by way of example, some email messages may be transmitted as part of a phishing scam, described in more detail herein. Other messages may solicit customers for black- and/or grey-market goods, such as pirated software, counterfeit designer items (including without limitation watches, handbags, etc.). Still other messages may be advertisements for legitimate goods, but may comprise unlawful or otherwise forbidden (e.g., by contract) practices, such as improper trademark use and/or infringement, deliberate under-pricing of goods, etc. Various embodiments of the invention can be configured to search for, identify and/or respond to one or more of these practices, as detailed below. (It should be noted as well that certain embodiments may be configured to access, monitor, crawl, etc. data sources—including zone files, web sites, chat rooms, etc.—other than email feeds for similar conduct). Merely by way of example, the system 100 could be configured to scan one or more data sources for the term ROLEX, and/or identify any improper advertisements for ROLEX watches.

Those skilled in the art will further appreciate that an average email address will receive many unsolicited email messages, and the system 100 may be configured, as described below, to receive and/or analyze such messages. Incoming messages may be received in many ways. Merely by way of example, some messages might be received "randomly," in that no action is taken to prompt the messages. Alternatively, one or more users may forward such messages to the system. Merely by way of example, an ISP might instruct its users to forward all unsolicited messages to a particular address, which could be monitored by the system 100, as described below, or might automatically forward copies of users' incoming messages to such an address. In particular embodiments, an ISP might forward suspicious messages transmitted to its users (and/or parts of such suspicious messages, including, for example, any URLs included in such messages) to the system 100 (and/or any appropriate component thereof) on a periodic basis. In some cases, the ISP might have a filtering system designed to facilitate this process, and/or certain features of the system 100 might be implemented (and/or duplicated) within the ISP's system.

As described above, the system 100 can also plant or "seed" bait email addresses (and/or other bait information) in certain of the data sources, e.g. for harvesting by spammers/phishers. In general, these bait email addresses are designed to offer an attractive target to a harvester of email addresses, and the bait email addresses usually (but not always) will be generated specifically for the purpose of attracting phishers and therefore will not be used for normal email correspondence.

Returning to FIG. 1A, therefore, the system 100 can further include a "honey pot" 110. The honey pot 110 can be used to receive information from each of the data sources 105 and/or to correlate that information for further analysis if needed. The honey pot 110 can receive such information in a variety of ways, according to various embodiments of the invention, and how the honey pot 110 receives the information is discretionary.

Merely by way of example, the honey pot 100 may, but need not, be used to do the actual crawling/monitoring of the data sources, as described above. (In some cases, one or more other computers/programs may be used to do the actual crawling/monitoring operations and/or may transmit to the honey pot 110 any relevant information obtained through such operations. For instance, a process might be configured to monitor zone files and transmit to the honey pot 110 for analysis any new, lapsed and/or otherwise modified domain registrations. Alternatively, a zone file can be fed as input to the honey pot 110, and/or the honey pot 110 can be used to search for any modified domain registrations.) The honey pot 110 may also be configured to receive email messages (which might be forwarded from another recipient) and/or to monitor one or more bait email addresses for incoming email. In particular embodiments, the system 100 may be configured such that the honey pot 110 is the mail server for one or more email addresses (which may be bait addresses), so that all mail addressed to such addresses is sent directly to the honey pot 110. The honey pot 110, therefore, can comprise a device and/or software that functions to receive email messages (such as an SMTP server, etc.) and/or retrieve email messages (such as a POP3 and/or IMAP client, etc.) addressed to the bait email addresses. Such devices and software are well-known in the art and need not be discussed in detail herein. In accordance with various embodiments, the honey pot 110 can be configured to receive any (or all) of a variety of well-known message formats, including SMTP, MIME, HTML, RTF, SMS and/or the like. The honey pot 110 may also comprise one or more databases (and/or other data structures), which can be used to hold/categorize information obtained from email messages and other data (such as zone files, etc.), as well as from crawling/monitoring operations.

In some aspects, the honey pot 110 might be configured to do some preliminary categorization and/or filtration of received data (including without limitation received email messages). In particular embodiments, for example, the honey pot 110 can be configured to search received data for "blacklisted" words or phrases. (The concept of a "blacklist" is described in further detail below). The honey pot 110 can segregate data/messages containing such blacklisted terms for prioritized processing, etc. and/or filter data/messages based on these or other criteria.

The honey pot 110 also may be configured to operate in accordance with a customer policy 115. An exemplary customer policy might instruct the honey pot to watch for certain types and/or formats of emails, including, for instance, to search for certain keywords, allowing for customization on a customer-by-customer basis. In addition, the honey pot 110 may utilize extended monitoring options 120, including monitoring for other conditions, such as monitoring a customer's web site for compromises, etc. The honey pot 110, upon receiving a message, optionally can convert the email message into a data file.

In some embodiments, the honey pot 110 will be in communication with one or more correlation engines 125, which can perform a more detailed analysis of the email messages (and/or other information/data, such as information received from crawling/monitoring operations) received by the honey pot 110. (It should be noted, however, that the assignment of functions herein to various components, such as honey pots 110, correlation engines 125, etc. is arbitrary, and in accordance with some embodiments, certain components may embody the functionality ascribed to other components.)

On a periodic basis and/or as incoming messages/information are received/retrieved by the honey pot 110, the honey pot 110 will transmit the received/retrieved email messages (and/or corresponding data files) to an available correlation engine 125 for analysis. Alternatively, each correlation engine 125 may be configured to periodically retrieve messages/data files from the honey pot 110. For example, in certain implementations, the honey pot 110 may store email messages and/or other data (which may or may not be categorized/filtered), as described above, and each correlation engine may retrieve data and/or messages on a periodic and/or ad hoc basis. For instance, when a correlation engine 125 has available processing capacity (e.g., it has finished processing any data/messages in its queue), it might download the next one hundred messages, data files, etc. from the honey pot 110 for processing. In accordance with certain embodiments, various correlation engines (e.g., 125a, 125b, 125c, 125d) may be specifically configured to process certain types of data (e.g., domain registrations, email, etc.). In other embodiments, all correlation engines 125 may be configured to process any available data, and/or the plurality of correlation engines (e.g., 125a, 125b, 125c, 125d) can be implemented to take advantage of the enhanced efficiency of parallel processing.

The correlation engine(s) 125 can analyze the data (including, merely by way of example, email messages) to determine whether any of the messages received by the honey pot 110 are phish messages and/or are likely to evidence a fraudulent attempt to collect personal information. Procedures for performing this analysis are described in detail below.

The correlation engine 125 can be in communication with an event manager 135, which may also be in communication with a monitoring center 130. (Alternatively, the correlation engine 125 may also be in direct communication with the monitoring center 130.) In particular embodiments, the event manager 135 may be a computer and/or software application, which can be accessible by a technician in the monitoring center 130. If the correlation engine 125 determines that a particular incoming email message is a likely candidate for fraudulent activity or that information obtained through crawling/monitoring operations may indicate fraudulent activity, the correlation engine 125 can signal to the event manager 135 that an event should be created for the email message. In particular embodiments, the correlation engine 125 and/or event manager 135 can be configured to communicate using the Simple Network Management ("SNMP") protocol well known in the art, and the correlation engine's signal can comprise an SNMP "trap" indicating that analyzed message(s) and/or data have indicated a possible fraudulent event that should be investigated further. In response to the signal (e.g., SNMP trap), the event manager 135 can create an event (which may comprise an SNMP event or may be of a proprietary format).

Upon the creation of an event, the event manager 135 can commence an intelligence gathering operation (investigation) 140 of the message/information and/or any URLs included in and/or associated with message/information. As described in detail below, the investigation can include gathering information about the domain and/or IP address associated with the URLs, as well as interrogating the server(s) hosting the resources (e.g., web page, etc.) referenced by the URLs. (As used herein, the term "server" is sometimes used, as the context indicates, any computer system that is capable of offering IP-based services or conducting online transactions in which personal information may be exchanged, and specifically a computer system that may be engaged in the fraudulent collection of personal information, such as by serving web pages that request personal information. The most common example of such a server, therefore, is a web server that operates using the hypertext transfer protocol ("HTTP") and/or any of several related services, although in some cases, servers may provide other services, such as database services, etc.). In certain embodiments, if a single email message (or information file) includes multiple URLs, a separate event may be created for each URL; in other cases, a single event may cover all of the URLs in a particular message. If the message and/or investigation indicates that the event relates to a particular customer, the event may be associated with that customer.

The event manager can also prepare an automated report 145 (and/or cause another process, such as a reporting module (not shown) to generate a report), which may be analyzed by an additional technician at the monitoring center 130 (or any other location, for that matter), for the event; the report can include a summary of the investigation and/or any information obtained by the investigation. In some embodiments, the process may be completely automated, so that no human analysis is necessary. If desired (and perhaps as indicated by the customer policy 115), the event manager 135 can automatically create a customer notification 150 informing the affected customer of the event. The customer notification 150 can comprise some (or all) of the information from the report 145. Alternatively, the customer notification 150 can merely notify the customer of an event (e.g., via email, telephone, pager, etc.) allowing a customer to access a copy of the report (e.g., via a web browser, client application, etc.). Customers may also view events of interest to the using a portal, such as a dedicated web site that shows events involving that customer (e.g., where the event involves a fraud using the customer's trademarks, products, business identity, etc.).

If the investigation 140 reveals that the server referenced by the URL is involved in a fraudulent attempt to collect personal information, the technician may initiate an interdiction response 155 (also referred to herein as a "technical response"). (Alternatively, the event manager 135 could be configured to initiate a response automatically without intervention by the technician). Depending on the circumstances and the embodiment, a variety of responses could be appropriate. For instance, those skilled in the art will recognize that in some cases, a server can be compromised (i.e., "hacked"), in which case the server is executing applications and/or providing services not under the control of the operator of the server. (As used in this context, the term "operator" means an entity that owns, maintains and/or otherwise is responsible for the server.) If the investigation 140 reveals that the server appears to be compromised, such that the operator of the server is merely an unwitting victim and not a participant in the fraudulent scheme, the appropriate response could simply comprise informing the operator of the server that the server has been compromised, and perhaps explaining how to repair any vulnerabilities that allowed the compromise.

In other cases, other responses may be more appropriate. Such responses can be classified generally as either administrative 160 or technical 165 in nature, as described more fully below. In some cases, the system 100 may include a dilution engine (not shown), which can be used to undertake technical responses, as described more fully below. In some embodiments, the dilution engine may be a software application running on a computer and configured, inter alia, to create and/or format responses to a phishing scam, in accordance with methods of the invention. The dilution engine may reside on the same computer as (and/or be incorporated in) a correlation engine 125, event manager 135, etc. and/or may reside on a separate computer, which may be in communication with any of these components.

As described above, in some embodiments, the system 100 may incorporate a feedback process, to facilitate a determination of which planting locations/techniques are relatively more effective at generating spam. Merely by way of example, the system 100 can include an address planter 170, which may provide a mechanism for tracking information about planted addresses, as described above. Correspondingly, the event manager 135 may be configured to analyze an email message (and particular, a message resulting in an event) to determine if the message resulted from a planting operation. For instance, the addressees of the message may be evaluated to determine which, if any, correspond to one or more address(es) planted by the system 100. If it is determined that the message does correspond to one or more planted addresses, a database of planted addresses may be consulted to determine the circumstances of the planting, and the system 100 might display this information for a technician. In this way, a technician could choose to plant additional addresses in fruitful locations. Alternatively, the system 100 could be configured to provide automatic feedback to the address planter 170, which in turn could be configured to automatically plant additional addresses in such locations.

In accordance with various embodiments of the invention, therefore, a set of data about a possible online fraud (which may be an email message, domain registration, URL, and/or any other relevant data about an online fraud) may be received and analyzed to determine the existence of a fraudulent activity, an example of which may be a phishing scheme. As used herein, the term "phishing" means a fraudulent scheme to induce a user to take an action that the user would not otherwise take, such as provide his or her personal information, buy illegitimate products, etc., often by sending unsolicited email message (or some other communication, such as a telephone call, web page, SMS message, etc.) requesting that the user access an server, such as a web server, which may appear to be legitimate. If so, any relevant email message, URL, web site, etc. may be investigated, and/or responsive action may be taken. Additional features and other embodiments are discussed in further detail below.

Figure 2:
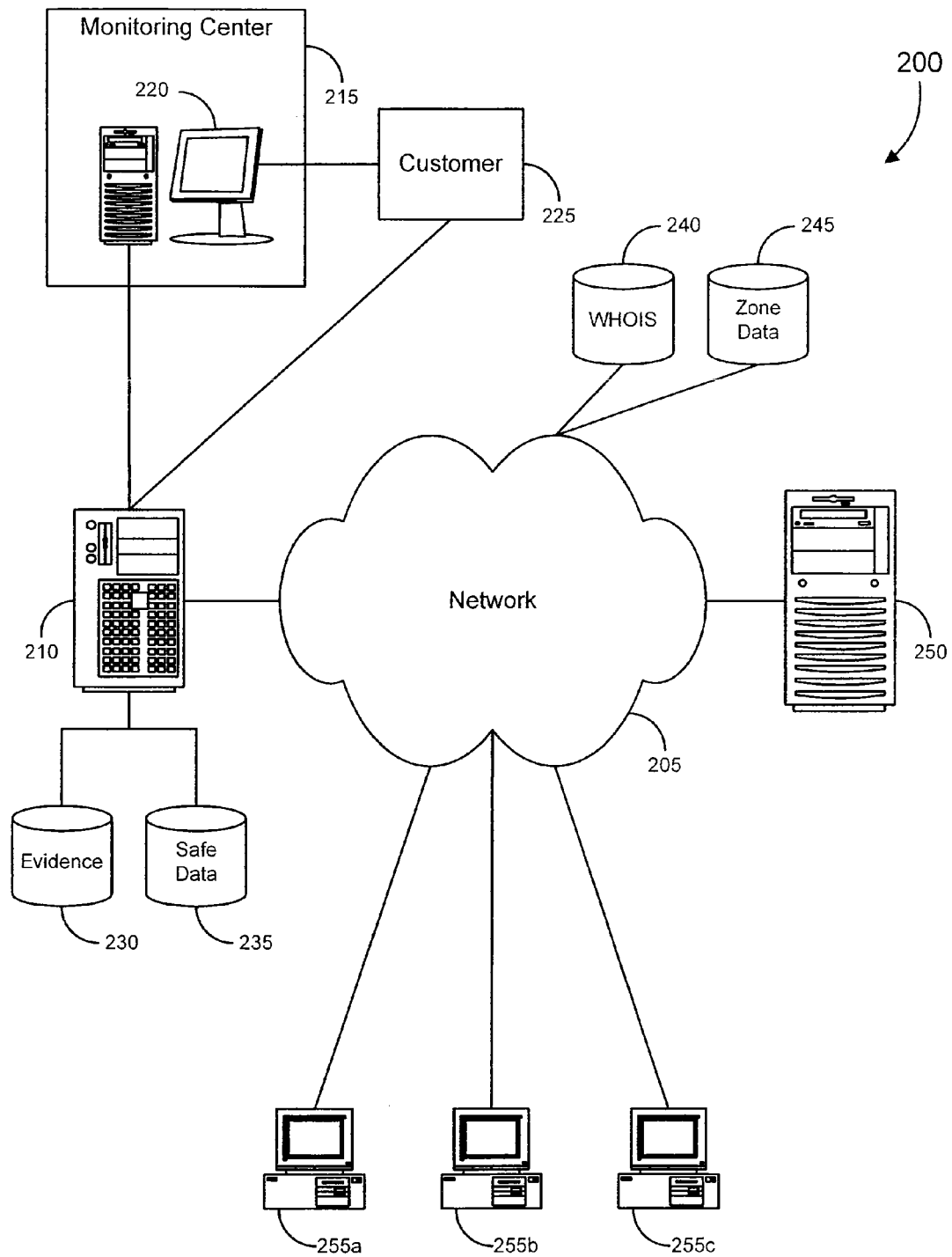
FIG. 2 is a schematic diagram illustrating a system for combating online fraud, in accordance with various embodiments of the invention.

As noted above, certain embodiments of the invention provide systems for dealing with online fraud. The system 200 of FIG. 2 can be considered exemplary of one set of embodiments. The system 200 generally runs in a networked environment, which can include a network 205. In many cases, the network 205 will be the Internet, although in some embodiments, the network 205 may be some other public and/or private network. In general, any network capable of supporting data communications between computers will suffice. The system 200 includes a master computer 210, which can be used to perform any of the procedures or methods discussed herein. In particular, the master computer 210 can be configured (e.g., via a software application) to crawl/monitor various data sources, seed bait email addresses, gather and/or analyze email messages transmitted to the bait email addresses, create and/or track events, investigate URLs and/or servers, prepare reports about events, notify customers about events, and/or communicate with a monitoring center 215 (and, more particularly, with a monitoring computer 220 within the monitoring center) e.g. via a telecommunication link. The master computer 210 may be a plurality of computers, and each of the plurality of computers may be configured to perform specific processes in accordance with various embodiments. Merely by way of example, one computer may be configured to perform the functions described above with respect to a honey pot, another computer may be configured to execute software associated with a correlation engine, e.g. performing the analysis of email messages/data files; a third computer may be configured to serve as an event manager, e.g., investigating and/or responding to incidents of suspected fraud, and/or a fourth computer may be configured to act as a dilution engine, e.g., to generate and/or transmit a technical response, which may comprise, merely by way of example, one or more HTTP requests, as described in further detail below. Likewise, the monitoring computer 220 may be configured to perform any appropriate functions.

The monitoring center 215, the monitoring computer 220, and/or the master computer 210 may be in communication with one or more customers 225 e.g., via a telecommunication link, which can comprise connection via any medium capable of providing voice and/or data communication, such as a telephone line, wireless connection, wide area network, local area network, virtual private network, and/or the like. Such communications may be data communications and/or voice communications (e.g., a technician at the monitoring center can conduct telephone communications with a person at the customer). Communications with the customer(s) 225 can include transmission of an event report, notification of an event, and/or consultation with respect to responses to fraudulent activities. According to one embodiment of the present invention, communications between the customer(s) 225 and the monitoring center 215 can comprise a web browser of the customer computer requesting fraud information regarding a requested or viewed page in order to determine whether fraudulent activity is associated with that page. Based on such information, an authentication authority or authentication service can verify and/or update registration information related to an entity or web site as will be discussed in detail below.

The master computer 210 can include (and/or be in communication with) a plurality of data sources, including without limitation the data sources 105 described above. Other data sources may be used as well. For example, the master computer can comprise an evidence database 230 and/or a database of "safe data," 235, which can be used to generate and/or store bait email addresses and/or personal information for one or more fictitious (or real) identities, for use as discussed in detail below. (As used herein, the term "database" should be interpreted broadly to include any means of storing data, including traditional database management software, operating system file systems, and/or the like.) The master computer 210 can also be in communication with one or more sources of information about the Internet and/or any servers to be investigated. Such sources of information can include a domain WHOIS database 240, zone data file 245, etc. Those skilled in the art will appreciate that WHOIS databases often are maintained by central registration authorities (e.g., the American Registry for Internet Numbers ("ARIN"), Network Solutions, Inc., etc), and the master computer 210 can be configured to query those authorities; alternatively, the master computer 210 could be configured to obtain such information from other sources, such as privately-maintained databases, etc. The master computer 210 (and/or any other appropriate system component) may use these resources, and others, such as publicly-available domain name server (DNS) data, routing data and/or the like, to investigate a server 250 suspected of conducting fraudulent activities. As noted above, the server 250 can be any computer capable of processing online transactions, serving web pages and/or otherwise collecting personal information.

The system can also include one or more response computers 255, which can be used to provide a technical response to fraudulent activities, as described in more detail in the Related Applications. In particular embodiments, one or more the response computers 255 may comprise and/or be in communication with a dilution engine, which can be used to create and/or format a response to a phishing scam. (It should be noted that the functions of the response computers 255 can also be performed by the master computer 210, monitoring computer 220, etc.) In particular embodiments, a plurality of computers (e.g., 255a-c) can be used to provide a distributed response. The response computers 255, as well as the master computer 210 and/or the monitoring computer 220, can be special-purpose computers with hardware, firmware and/or software instructions for performing the necessary tasks. Alternatively, these computers 210, 220, 255 may be general purpose computers having an operating system including, for example, personal computers and/or laptop computers running any appropriate flavor of Microsoft Corp.'s Windows and/or Apple Corp.'s Macintosh operating systems) and/or workstation computers running any of a variety of commercially-available UNIX or UNIX-like operating systems. In particular embodiments, the computers 210, 220, 255 can run any of a variety of free operating systems such as GNU/Linux, FreeBSD, etc.

The computers 210, 220, 255 can also run a variety of server applications, including HTTP servers, FTP servers, CGI servers, database servers, Java servers, and the like. These computers can be one or more general purpose computers capable of executing programs or scripts in response to requests from and/or interaction with other computers, including without limitation web applications. Such applications can be implemented as one or more scripts or programs written in any programming language, including merely by way of example, C, C++, Java, COBOL, or any scripting language, such as Perl, Python, or TCL, or any combination thereof. The computers 210, 220, 255 can also include database server software, including without limitation packages commercially available from Oracle, Microsoft, Sybase, IBM and the like, which can process requests from database clients running locally and/or on other computers. Merely by way of example, the master computer 210 can be an Intel processor-machine operating the GNU/Linux operating system and the PostgreSQL database engine, configured to run proprietary application software for performing tasks in accordance with embodiments of the invention.

In some embodiments, one or more computers 110 can create web pages dynamically as necessary for displaying investigation reports, etc. These web pages can serve as an interface between one computer (e.g., the master computer 210) and another (e.g., the monitoring computer 220). Alternatively, a computer (e.g., the master computer 210) may run a server application, while another (e.g., the monitoring computer 220) device can run a dedicated client application. The server application, therefore, can serve as an interface for the user device running the client application. Alternatively, certain of the computers may be configured as "thin clients" or terminals in communication with other computers.

The system 200 can include one or more data stores, which can comprise one or more hard drives, etc. and which can be used to store, for example, databases (e.g., 230, 235) The location of the data stores is discretionary. Merely by way of example, they can reside on a storage medium local to (and/or resident in) one or more of the computers. Alternatively, they can be remote from any or all of these devices, so long as they are in communication (e.g., via the network 205) with one or more of these. In some embodiments, the data stores can reside in a storage-area network ("SAN") familiar to those skilled in the art. (Likewise, any necessary files for performing the functions attributed to the computers 210, 220, 255 can be stored a computer-readable storage medium local to and/or remote from the respective computer, as appropriate.)

Figure 3:
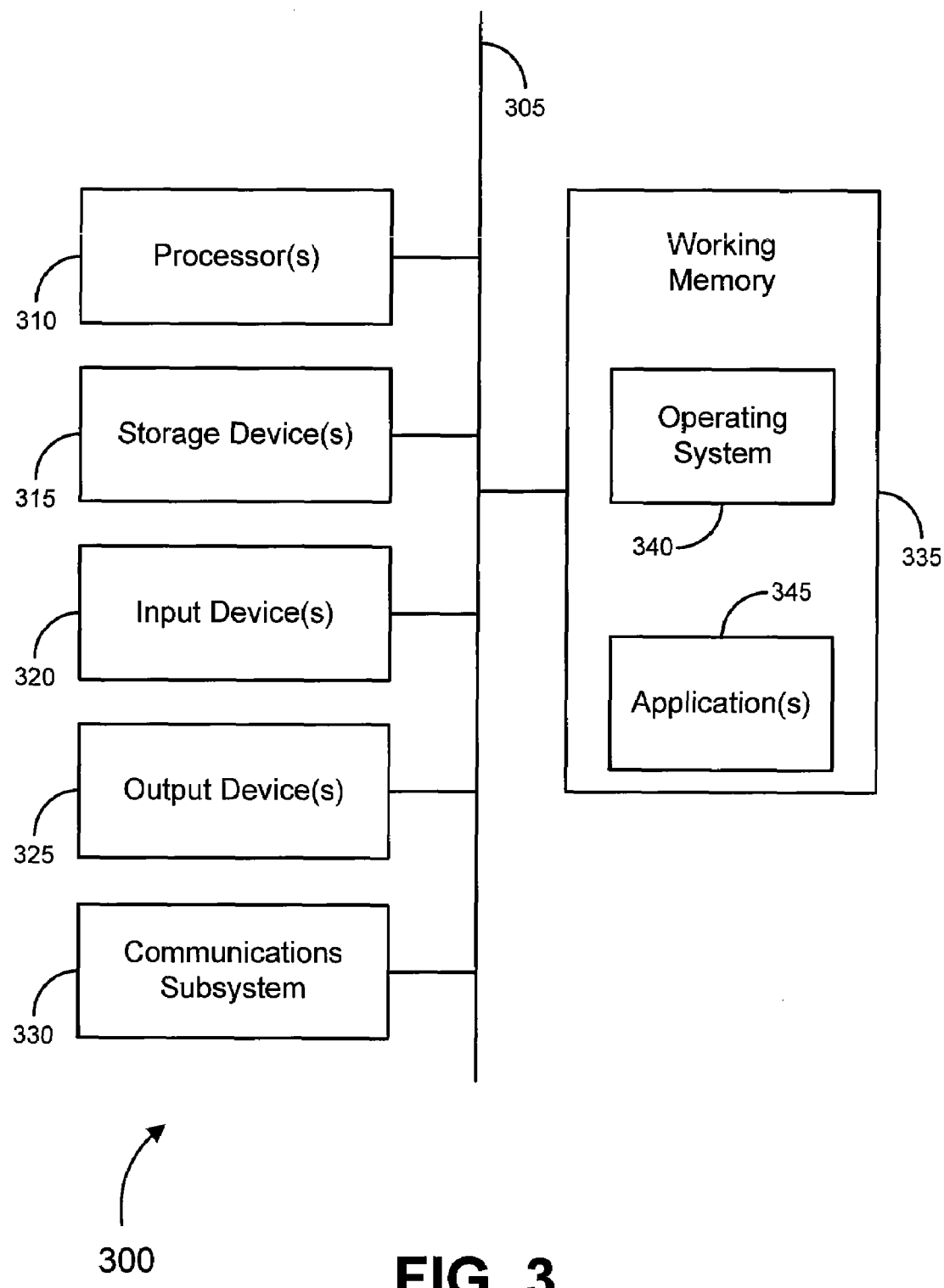
FIG. 3 is a generalized schematic diagram of a computer that may be implemented in a system for combating online fraud, in accordance with various embodiments of the invention.

FIG. 3 provides a generalized schematic illustration of one embodiment of a computer system 300 that can perform the methods of the invention and/or the functions of a master computer, monitoring computer and/or response computer, as described herein. FIG. 3 is meant only to provide a generalized illustration of various components, any of which may be utilized as appropriate. The computer system 300 can include hardware components that can be coupled electrically via a bus 305, including one or more processors 310; one or more storage devices 315, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 305 can be one or more input devices 320, which can include without limitation a mouse, a keyboard and/or the like; one or more output devices 325, which can include without limitation a display device, a printer and/or the like; and a communications subsystem 330; which can include without limitation a modem, a network card (wireless or wired), an infra-red communication device, and/or the like).

The computer system 300 also can comprise software elements, shown as being currently located within a working memory 335, including an operating system 340 and/or other code 345, such as an application program as described above and/or designed to implement methods of the invention. Those skilled in the art will appreciate that substantial variations may be made in accordance with specific embodiments and/or requirements. For example, customized hardware might also be used, and/or particular elements might be implemented in hardware, software (including portable software, such as applets), or both.

As noted above, embodiments of the present invention provide for authenticating a web site upon request. For example, a browser or other program running on a user's computer, can request a web page or a URL to a web page and may request authentication of that web page. As will be seen, authentication can be based in part on reputation information from a monitoring center such as monitoring center 215 described above with reference to FIG. 2. Based on such information, as well as other possible information or criteria, a determination can be made as to whether the web page is authentic. Based on this determination, the browser can then display an appropriate indication to the user.

Embodiments of the invention provide authentication. Merely by way of example, some embodiments may be configured to provide an indication to a client executing a browser that the web site and/or server (and more specifically, the domain name or IP address) they are interacting with is the domain name or IP address that it says it is, and that domain name or IP addresses are owned by the presumably legitimate entity commonly and/or legally associated with the domain name or IP address.

For example, providers of client applications might create systems supporting full-featured alerting and/or reporting capabilities that have one or more of the following characteristics: 1) central reputation repositories securely accessible to entities that provide the relevant alerts, reputation data, logic and/or related reporting; 2) a secure means to receive requests and/or to report data between the repository and/or the client; 3) multiple types of event and/or alert logic; 4) support for a full range and/or pallet of positive, mixed, multi-factor, neutral and/or negative alerts; 5) support for a full range of event and/or logic driven messages, comments, suggestions and/or directions to the client; and/or 6) the ability to use domain names and/or IP addresses, entered as Uniform Resource Locators and/or other means, as the trigger to identify, create and/or deliver specific alerts, messages or instructions.

Embodiments of the invention then, provide the ability of a supported browser (including but not limited to Microsoft® Internet Explorer® 7, perhaps together with a URS and/or similar reputation repository, provide a secure client reporting system, which might be used to provide simple, reliable and/or inexpensive two-way domain name and/or IP authentication of well known corporations or entities to consumers on the Internet without the consumer having to do more than read and understand simple alerts or messages within the browser or other reporting client.

Various embodiments may be particularly useful in assuring a customer that the first page they go to, before they enter a more secure mode such as certificate supported HTTPS, is in fact the entity they think it is. As described below, some embodiments might not require a certificate (or HTTPS), yet might still provide authentication and ownership identification and/or validation data associated with a domain name (or IP address) securely and accurately.

When used in conjunction with systems such as those described in the Related Applications, embodiments of the invention might also provide highly reliable, scaleable and/or economic solutions to end-to-end authentication for both sides of B2C and/or consumer to business transactions without requiring the consumer to install, learn and/or comply with costly, complex or annoying authentication systems such as tokens, certificates or two-factor log-in paraphernalia and procedures. This system is much easier for the principal to deploy, control and/or manage, and/or much simpler and/or transparent to the intentional and/or accidental consumer verifier.

In some embodiments, as will be described in detail below, an authentication system can implement validation and authentication as an integrated part of the domain name or IP address registration and life cycle management process. In other embodiments, the system can be extensible and may be used to implement multiple category specific (and opt in) reputation based alerts or communications that can be tied to a domain name or IP address.

In a set of embodiments, in order to provide the first part of authentication of a domain name or IP address (e.g., in a B2C setting to name but one example), the system can be configured to be able to identify correctly and communicate securely with an end user (e.g., a consumer) that the domain name or IP address actually belongs to an entity (e.g., the business) that is commonly and/or legally associated with that domain name or IP address. In an aspect of some embodiments, the system can be configured to protect the integrity of that data from the point of creation through its presentation to the end user (and/or any other party) who wants to know (or should want to know) if the domain name or IP address is actually owned by the entity (e.g. a well known business) that is commonly and/or legally associated with the domain name or IP address or potentially different types of related or supporting information related to that ownership.

Conversely, it may be desirable, in some cases, for the business to implement relatively stronger authentication of the consumer before granting access to its systems, although this complexity may be hidden or transparent to the consumer to avoid discouraging or annoying the customer. Hence, in some embodiments, such client authentication may be implemented using an authentication system and method described in U.S. patent application Ser. No. 11/237,642, already incorporated by reference.

Figure 4:
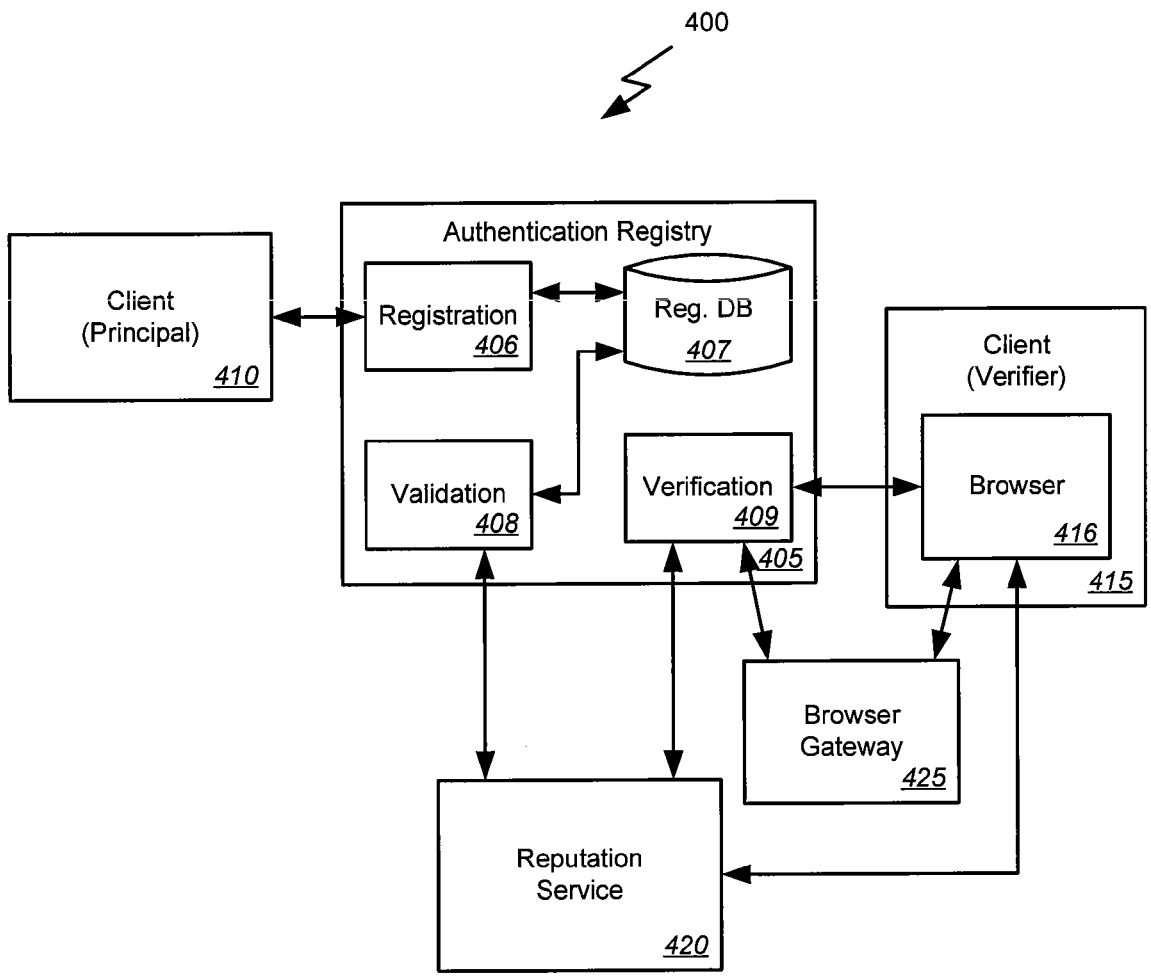
FIG. 4 is a block diagram conceptually illustrating a system for providing authentication of a web site according to one embodiment of the present invention.

FIG. 4 is a block diagram conceptually illustrating a system for providing authentication of a web site according to one embodiment of the present invention. In this example, the system 400 includes a first client or principal 410, a second client or verifier 415, and an authentication registry 405. Optionally, the system 400 can also include a reputation service 420 such as the URS or other reputation service as described above or in the Related Applications. The components 405-420 of the system can be communicatively coupled with each other via one or more communications networks such as the Internet or other communications network as described above.

As used herein, the term "principal" refers to the party whose identification is being verified, and the term "verifier" refers to the entity who is demanding assurance of the principal's identity. In some embodiments, the principal 410 might be an entity that commonly and/or legally is associated with a domain name or IP address (e.g. a well-known business) and the verifier 415 might be a known or anonymous Internet user, client, or end user application that is accessing an Internet site and/or which demands, assumes, or wants to know that it is, or probably is, reaching a site owned, associated, and/or under the control of the principal 410, or, conversely, that this is not the case, not known or not knowable. The system 400 can provide assurance to the verifier 415 that the domain names and/or addresses they believe belong to a principal 410, whose legal addresses, common identifiers, or credential information are known, readily available, verifiable, or otherwise knowable, actually belong to that principal 410, or conversely that this is not the case (or perhaps that this is not known or not knowable).

In one set of embodiments, the system 400 can provide B2C authentication, where a business is the principal 410 and/or the consumer is a verifier 415. In this case, the principal 410 wants its domain name or IP address to be authenticated to the verifier 415. This is important for most legitimate businesses or entities, who want customers to know who they are for sure, so the customers feel more secure in conducting business or obtaining services via the Internet. Conversely, the verifier 415 wants to know who the principal 410 actually is, and whether the principal 410 would like to identify itself accurately, so the verifier 415 knows who it is (or would be) interacting with, or alternatively so that the verifier 415 knows that it does not who it is (or would be) interacting with. For instance, the verifier 415 may be concerned, or should be concerned, that a principal 410 may not actually be the entity that is commonly and/or legally associated with a domain name or IP address.

In some cases, the system also includes a trusted third party (referred to herein as an "authentication registry" and/or "authentication authority") 405 who may know, create and/or obtain specific domain names and/or IP addresses of interest to the principal 410; who may determine and/or verify the underlying identity or ownership data, such as from WHOIS information, proprietary, public, private or derivable registrations, incorporations, public records, filings, audits, certification, histories, relationships, reports, investigations, analysis, interviews, questionnaires, surveys, background checks, investigations and/or other records, which may be associated in some way with the domain names and/or IP addresses; and/or who may certify (directly and/or indirectly) that the principal 410 is who it says it is, that the principal's ownership and/or identity records are accurate and/or that that the domain names and/or ownership and/or identity records are bound to (and/or associated with) each other accurately and/or securely. In certain instances, the authentication registry 405 may determine and/or certify that the above is true, not true, false, partially true, qualified, incomplete, probable, unknown and/or not knowable at any point in time, during any definable period, under any qualified circumstances and/or for any qualified purposes.

Optionally, there may be parties who manage submission and/or administrative support for principals 410 and/or on behalf of the authentication registry 405 and/or authentication authority who wish to obtain authentication services from the authentication registry 405. These parties are referred to herein as "authentication registrars." For simplicity, the term authentication registry is used herein to mean authentication registry, authentication authority, and/or authentication registrar, which may be acting as an agent of the authentication registry.

In some embodiments, an authentication model or system such as authentication registry 405, can operate to simplify authentication (e.g., in the B2C environment), such as when a principal 410 registers a domain name or IP address. In some cases, a set of supporting identity and/or ownership information may also be validated as described herein and/or provided e.g., directly and/or indirectly to the URS and/or similar central reputation service 420 underlying the secure reporting capabilities browsers or reputation-enabled client applications described herein and in the Related Applications, such that they can be used to deliver secure enhanced authentication services or information to the user of the browser 416 or client system 415. Authentication enabled by this system 400 might be similar in some, but perhaps not all, respects to a certificate-based authentication service. In embodiments of the invention, however, the system 400 might not require or rely on a certificate to operate or to provide ownership and/or identity information about the principal 410.

This system 400 may be implemented together with or as a part of the domain name or IP address registration process 406. The system 400 also may create and deliver much more complete, detailed, multi-dimensional, appropriate, useful and/or nuanced alerts, messages and/or reporting related to the domain name or IP address than are available from certificate based systems. There are no limits on the types of information and/or alerts about a domain name or IP address that may be provided. Examples include identity, ownership, relationship, reputation, technical, historical, business, security, time based and/or other attributes that inform a domain name or IP address in a useful way. These include, but are not limited to, concepts such as reputation and/or reputation scores, and/or how they may be used, as described, for example, in the Related Applications.

The net result, in some cases, is that the principal 410 can authenticate itself to the consumer or other verifier 415 by simply participating in the normal domain registration process 406, enhanced via a validation process 408. The verifier 415 can receive authentication information from the principal 410 by entering the principal's domain name or IP address in an enabled browser 416 or client application. Because the system 400, in some embodiments, can be secure end-to-end, there is no need for the principal to also purchase a public key certificate and/or to require that the system operate in secure (e.g., HTTPS) mode. However, it should be noted that systems in accordance with certain embodiments may work in conjunction with certificates and/or HTTPS security, or in fact can be used, in some cases, to simplify the operation of certificates such as free-ware certificates by creating domain name or IP address or validated registration data pairs to access certificates, but a feature of certain embodiments is the ability to provides digital certificate-like authentication or identification without requiring a certificate.

Additionally or alternatively, the authentication system 400 may be designed to minimize the potential for phishers and/or other scammers to create social engineering attacks based on the authentication programs/models themselves. Embodiments of the system 400 thus may be designed to be as transparent to the verifier 415 as possible and/or to minimize the requirement for the verifier 415 to do and/or know anything to use the system 400, beyond perhaps reading and understanding clear statements about the real identity of the principal 410. This simplicity or transparency may help to overcome the complexity, heterogeneity, communications challenges, confusion, bother and/or time requirements that make other approaches to authentication tempting targets themselves for social engineering or other attacks in a consumer environment.

In use, the principal 410 might provide, via registration process 406, a list of some or all of its domain names or IP addresses to the authentication registry 405 or allow these to be determined or harvested (perhaps by the registry 405 or registrar). The principal 410 might also agree to undertake, or to have undertaken, an effort to confirm that the resulting list is a complete and accurate list of legally- and/or validly-owned names or IP addresses the principal 410 desires to have registered with the system 400 and that a verifier 415 desires to know as correctly belonging to or identifying the principal 410.

In one embodiment, the authentication registry 405 can act as an authorized registrar, manager, and/or agent for all of the principal's domain name or IP address registrations or key related services, e.g., in order to simplify management, control, accuracy and/or reliability of the list of domain names and/or IP addresses being authenticated or reputation informed as well as the identity and/or reputation data related to them such as from reputation service 420. This self-contained life cycle management process may be used to ensure that the portfolio of domain names and/or IP addresses is accurate and complete, and that the identity and reputation data associated with it is accurate and complete as well.

In some cases, once the authentication registry 405 has collected some or all of the presumably valid domain names and/or IP addresses claimed by the principal 410 as correctly and/or legally owned by them, the authentication registry 405 can create or obtain specific levels or types of validation, directly or via third parties, that support the principal's claim to legal and/or valid ownership or right of use of the domain names or IP addresses. This validation process 408 may result in adjustments to the portfolio and/or qualified validations, if certain legal ownership and/or use rights cannot be supported or corroborated, are different than those claimed, or are questionable or unknowable. The validation process 408 may also result in one or more statements by the authentication registry 405 or a third-party describing in legal or other terms the accurate level of legal ownership or usage rights to the domain names or IP addresses claimed by or associated with the principal 410. In some instances, the validation process 408 may be used to intentionally confirm or prove that a principal 410 does not or has not owned or maintain associations with a domain name or IP address. Additional details of validation process 408 will be discussed below with reference to FIGS. 6 and 7.

In the case of authenticating email, the principal's domain name records may be modified and/or other steps taken to implement supplemental systems, such as Sender Policy Framework ("SPF"), which is a standard being implement by many of the largest consumer Internet Service Providers that prevents return-path address spoofing, and/or others, for the domain names that are to be authenticated. Alternatively or in addition, the domain name record may be modified and/or others steps taken to implement DomainKeys for the IP addresses to be authenticated.

According to one embodiment, the authentication registry 405 can establish a secure or trusted link to the URS or similar central reputation service 420, which in turn maintains a secure link to the secure reporting features on the browser 416 or to similar secure reporting features on client applications. The system 400 can use these services, and/or may take additional steps, to obtain a secure, confidential, reliable, authenticated or non-repudiable end-to-end link between the authentication registry 405 and the secure mode reporting feature on the browser 416, or similar end-to-end system. This domain name or IP address based authentication registry 405 and secure reporting model can also generally work for any reputation informed system similar to the URS that includes key capabilities such as a similar reputation repository, API or other access to the repository, an end-to-end secure link, a secure client interface, a client side triggering system to initiate lookups, interpretive analytics that enhance or inform the lookups to make them relevant or useable to the client, and/or relevant usage agreements between the parties involved.

Alternatively, the authentication registry 405 can establish a secure link to a gateway 425, which in turn has a secure link to reporting feature on the browser 416 or other client application. At this point, there is an end-to-end secure link between the provider of the authentication registry 405 and the reporting feature on the browser 416, which is enabled and supported by a usage agreement between the provider of the authentication registry 405 and the provider of the browser 416. The system can work for any client application where there is an end-to-end secure link and usage agreement is in place.

The authentication registry 405 might also develop a rich database 407 of identity, ownership and/or relationship data that are have a definable relationship and/or nexus with a domain name or IP address. The Related Applications describe several such databases 407, any of which might be used (perhaps with appropriate modification) as an authentication registry 405 in various embodiments of the invention. As described in the Related Applications, the identity, ownership and/or relationship data may be actual, tangential, positive, negative, historical, time based and/or other and/or may be based on any information, records, histories, events cases and/or other input that may be known, harvested, derivable and/or obtained in any manner. The relationship between the domain name or IP address and the data may, in some cases, be validated, proven, provable, certain, probable, uncertain, false and/or definable in multiple meaningful ways.

In the case that the authentication registry obtains information that is not complete or not accurate, the authentication registry may allow the owner of the domain to update that information with the authentication registry. This updating of information can be performed by creating a secure communication channel with the confirmed owner of the domain. An example of this is confirming the ability to receive email at an email address that is known to be controlled by the owner of the domain. The updated information given by the owner of the domain to the authentication registry can allow the registry to make improved decisions about the accuracy, reputation, etc. of the domain.

The authentication registry 405 might also develop and/or maintain useful or appropriate relationships, links, connections, statistics, analytics, alerts and/or reporting between the domain names and/or IP addresses and the identity, ownership and relationship data. The authentication authority may also develop and/or maintain appropriate methods or scenarios to trigger or present these relationships in response to the user or an application entering, clicking on or linking to one or more domain names or IP addresses or performing other defined events.

In some cases, the authentication registry 405 might implement systems, interfaces, standards and/or procedures to create, replicate, update, modify, qualify, revoke and/or manipulate any or all of the rich database 407 above as well as any or all of the associated relationships or logic within the URS or similar system. In addition, the authentication registry 405 might implement systems and/or procedures to ensure that this data is appropriate, timely, valid, authenticated, secure, controlled, non-repudiable and accurate.

In other embodiments, the authentication registry 405 may provide real-time, event-based, user-initiated or batch access, updates, alerts, status, comments, instructions, messages, logic, applets and/or other data from the authentication registry database 407 to the URS or similar system, perhaps via an API or other means. Such information or notices might relate to or inform all domain names or IP addresses it has validated or associated with legal ownership or usage rights data on behalf of the principals for whom it is providing authentication services. Conversely, the authentication registry may create and/or provide the same types of data, alerts, comments, etc. as above but for domain names or IP addresses where the legal ownership or usage rights data are presumed to be, are potentially or in fact are invalid, incorrect, not known, not knowable, questionable, expired or in some other questionable state.

This and/or other data of the registration database 407 keyed to domain names and/or IP addresses may be organized in many ways, including without limitation one or more areas or types of authentication; a full range of industry, subject matter or type classifications; a full range of positive to negative or conditional or qualified attributes; a full range of certainty to uncertainty of accuracy; a full range of time attributes; a full range of direct or indirect relationships; a fall range of multi-level alerting schemes (such as red, yellow, green, risk scores, etc.); a full range of message, communications or commenting schemes; a full range of text, data or format manipulation schemes; a full range of data identifiers or time stamps; a fall range of participation or permission options; or a full range of categorizations, some or all of which may be designed to inform or enable any type of reporting that might be tied to a domain name or IP address.

In some instances, the triggering events for alerts, warnings, assurances, instructions, messages, comments or data to be sent to the reporting feature in the browser 416 (or other client) may indicate that a domain name or IP address are entered or referenced within the secure browser 416 or application by some means, such as the user (e.g., the verifier) typing the domain/address or clicking on links embedded in a web page or application, or the application itself calling or referencing a domain name or IP address. However, a user or application may trigger any of the above separate or independent of the presence or use of a domain name or IP address.

The system 400 may include unique identifiers or counters for some or all domains/addresses or for some or all alerts, messages or other communications to the verifier 415. In some instances, these identifiers can be used in support of additional off-line customer care or validation, such as a verifier calling into a call center to make sure it interprets or understand the domain name or IP address ownership or usage rights data it is receiving or online customer care or enhanced services, such as a verifier clicking on a link or entering a URL or request to the system to provide or submit additional data, to ask a question, to obtain a clarification or to request or initiate additional validation or confirmation steps or data. These identifiers may also be used in support of security, audit, modeling, trending, pattern recognition, usage monitoring or other purposes.

The system 400 may be used, among other purposes, to provide authentication between a principal 410 and/or verifier 415. In this instance, the verifier 415 may enter, by hand or via a click-through link or via another application, a domain name or IP address, usually thought to belong to the principal 410. The system 400 might perform a lookup in a database 407 in order to access data provided by the authentication registry 405 or to trigger logical operations on the data. Depending on the capabilities of the database 407 or of the data or analytics made available (e.g., by an authentication registry) within the repository or the details of what the reporting system in the client browser 416 or application supports or requests, the system might be configured to reliably and securely report relevant identity, ownership, trust or other data about or related to the principal 410 to the verifier 415.

The system 400 also may be used, among other purposes, to provide more detailed and/or easy to understand factual, qualitative, timely, topical or other useful information and/or advice about and/or related to the domain name or IP address. Sample messages may include, without limitation, one or more of the following: (1) A positive validation such as, "The domain name www.abccorp.com is verified by MarkMonitor Inc. to belong to ABC Inc., 111 5th Street, New York, N.Y. 10019." (This validation might be the basis for a business to authenticate itself to a consumer as part of a authentication process.); (2) Directive messages such as, "This is an authorized URL and/or commerce site (terms we define) of ABC Inc." or "This domain name belongs to ABC Inc. and/or is not authorized for external use and/or access."; (3) Informational messages, such as, "Detail on ABC Inc. or a list of approved access URLs may be obtained at https://www.markmonitor.com/ABCInc/validation or at +1.800.XXX.XXXX."; (4) Alert explanations, such as, "The domain name or IP address you have reached has been registered to an unverifiable party, or is not associated with ABC Inc." (This may be an explanation of a yellow alert, where the domain name is similar to ABC Inc. but where the authentication registry determines that the domain name is not ABC Inc. or that the domain name is question has a poor reputation score, for instance using a scoring systems such as those disclosed in the Related Applications, to name but a few examples.); (5) Category specific warnings such as, "The domain name or IP address you are attempting to access is considered by a rating agency to enable or contain mature adult materials." (Again, this might involve using reputation or reputation scoring systems similar to those described in the Related Applications to create category specific reputations the may matter to certain groups of users.); (6) Government, industry and/or other warnings, such as, "The domain name you are attempting to access has been identified by the FDA or FBI as offering drugs that are not approved for use or sale in the US."; or (7) Historical information related to any or all of the previous.

In some instances, the system 400 may be configured, perhaps in conjunction with supplemental systems, instrumentation or processes (including, merely by way of example, those described in the Related Applications) to monitor DNS integrity, perform web or other content matching, track access events, patters or behaviors, and/or to conduct other security monitoring or tests to ensure that the principals and verifiers systems or environments are not being compromised externally or internally. Merely by way of example, in some instances, integrity checks might be set up to ensure that designated domain names and/or IP addresses only interact with designated assets, such as IP addresses, DNS systems, network paths, operational environments, devices, ports, protocols, uniform resource locators (URLs), URL strings, payloads, applications, access controls and/or other definable assets.

In other embodiments, the authentication registry 405 might be configured to be the provider of the authoritative DNS service for the principal. This feature might improve overall systems security, reduce the risks of DNS poisoning, redirection, pharming and/or other similar attacks, help eliminate DNS mistakes and/or better enable monitoring of the DNS records for accuracy.

In certain embodiments, the system 400 might be configured to recognize common misspellings of well know domain names or similar names that are not owned by a known principal. For example, phishers have been known to use such similar or misspelled names as a means to deceive or divert consumers, to other sites including sites that further these approaches by engaging in brand abuse and/or corporate identity theft to engage in business diversion, fraud, counterfeiting, theft, etc. In these cases, the system may be used to provide warning alerts (such as a color-coded—e.g., yellow and/or red warning) depending on the type of abuse or fraud found on the site associated with the similar domain name as well as informational, interactive or advice oriented messages or features, such as additional detail, reasons, rational, conditions, qualifications, exceptions time associations, context alternatives, suggestions, help, contact data, contact methods and/or feedback data.) Such a warning might have a format similar to the following: "Notice: www.bankofammerica.com is registered to Foo Inc. by Unknown Registrar Inc., of country A. This address is NOT owned and/or associated with Bank of America, Inc. of Charlotte, N.C."

In certain cases, the system 400 can provide warnings if the payload data in the URL associated with the domain name or IP address included dangerous and/or unusual data such as access to a high port or secure application. Analysis by systems, such as those disclosed by the Related Applications, for instance, may be used to provide analysis supporting such features. Additional details and/or additional or alternative embodiments of methods and systems for reporting results of domain ownership validation to a verifier's browser are also described in the Related Applications, for example, in the application entitled "Browser Reputation Indicators with Two-Way Authentication" cited above.

Figure 5:
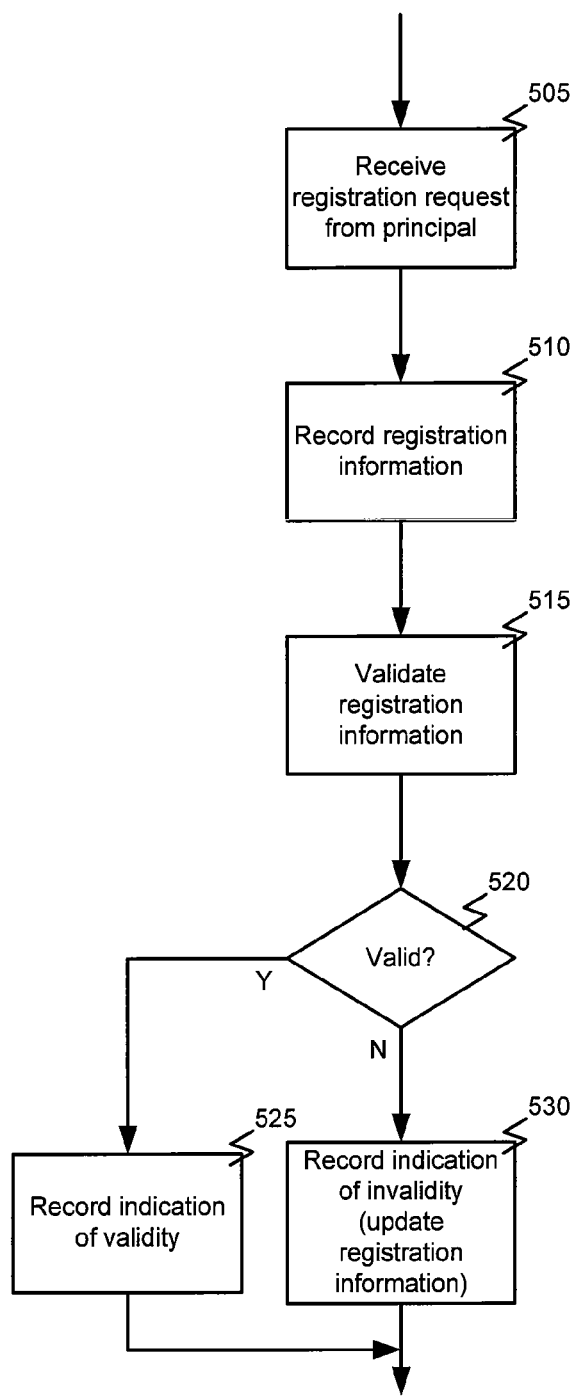
FIG. 5 is a flowchart illustrating a process for registering a domain with an authentication service according to one embodiment of the present invention.

FIG. 5 is a flowchart illustrating a process for registering a domain with a registration authority according to one embodiment of the present invention. In this example, processing begins with receiving 505 a registration request associated with a domain from a principal. As noted above, the registration request can include information identifying the domain, the principal, and other possible information.

Registration information can be recorded 510 in a registration data store. The registration information identifies the domain and, possibly, the principal. The registration data may include other information as well as described above. The registration information can be validated 515 in any of a number of different ways or based on any of a number of different factors as described above. Methods and systems for validating 515 domain registration information will be discussed in greater detail below with reference to FIGS. 6 and 7.

A determination 520 can be made as to whether the information identifying the domain is valid. In response to determining 520 the information identifying the domain is valid, an indication of validity associated with the domain can be recorded 525 in the registration data store. In response to determining 520 the information identifying the domain is invalid, an indication of invalidity associated with the domain can be recorded 530 in the registration data store. As described above, in response to determining the information identifying the domain is invalid the registration information can additionally or alternatively be updated to reflect the invalidity.

According to one embodiment, there is no need to create new standards for what ownership information should be associated with domain names for use in a validation process because ICANN has already established global standards. In addition, in the interest of keeping the rules related to Domain Name ownership record completeness and accuracy consistent, and to prevent phishing from arbitraging divergent rules, ICANN ownership records can be adopted as a standard.

Generally speaking, a domain ownership validation process can include confirming that the domain name whois ownership record is substantially complete. Upon confirming that the ownership records are substantially complete, the ownership data can be checked for accuracy. In order to confirm the accuracy of the ownership information, a domain name ownership manager can be designated by the domain name owner. Accordingly, this person can be authorized to include names and to confirm the accuracy of domain name ownership data for the entity. Multiple valid means of contacting the domain name ownership manager may be used such as an accurate address, phone, fax, email, etc. According to one embodiment, such contact can occur via a secure communications means such as secure email or another secure electronic connection. Thus, the designated domain name ownership manager may possess a High Assurance certificate for authenticating the entity and ensuring that all communications with the designated ownership manager are authenticated and non-repudiable. According to one embodiment, validation processes as described herein can be offered as part of a premium domain ownership validate service, which, like high assurance certificates, can be priced to be uneconomical for phishers and other scammers to try to infiltrate. However, these validated domains can be made economical enough for almost all businesses. Another embodiment includes an email validation process. The email validation mechanism can allow for an efficient way for a domain owner to provide updated information to the authentication registry with minimal inconvenience.

Figure 6:
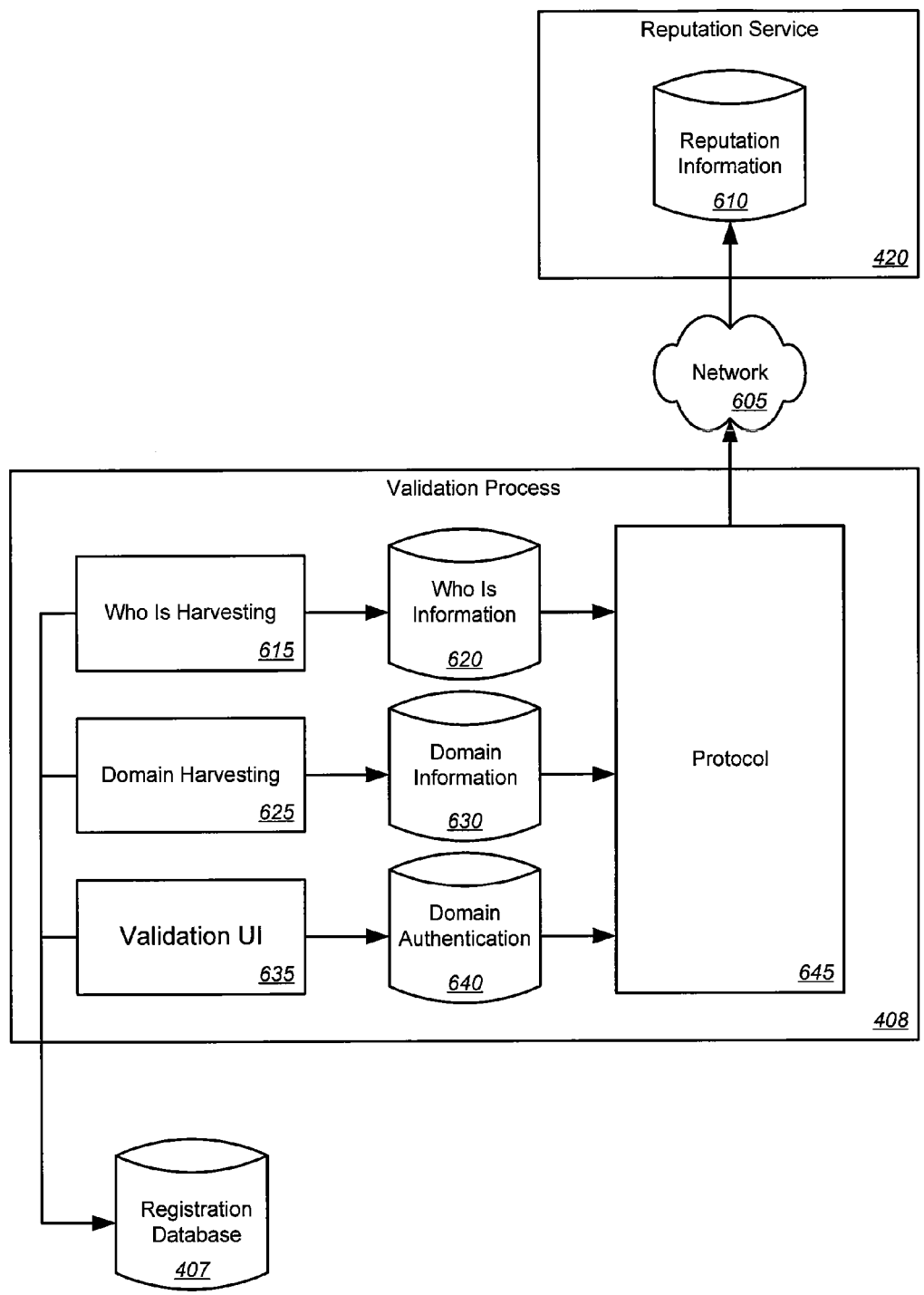
FIG. 6 is a block diagram illustrating elements used to provide validation of domain name ownership according to one embodiment of the present invention.

FIG. 6 is a block diagram illustrating elements used to provide validation of domain name ownership according to one embodiment of the present invention. This example illustrates a validation process 408 as may be implemented by an authentication registry 405 as discussed above with reference to FIG. 4. Also shown and as discussed above is a reputation service 420 which may be communicatively coupled with the validation process 408 via a network 605 such as the Internet or any other communication network.

The validation process 408 can include modules or processes for Who Is harvesting 615, i.e., for harvesting Who Is information 620 as discussed above, as well as for domain harvesting 625, i.e., for harvesting domain information 630 also as discussed above. The validation process 408 can also include a user interface 635 providing a means for local or remote users to interact with the validation process 408 and provide or access domain authentication information 640.

Generally speaking, the domain ownership validation process 408 can confirm that the domain name Who Is ownership information 620 collected by the Who Is harvesting process 615 and/or the domain information 630 collected by the domain harvesting process 625 is substantially complete. Upon confirming that the ownership records are substantially complete, the ownership data can be checked for accuracy. According to one embodiment, to confirm the accuracy of the ownership information, a designated domain name ownership manager (not shown here) can be contacted, for example via the validation user interface 635 or other means to provide an indication of the validity of the collected information. According to one embodiment, such contact can occur via a secure communications means such as secure email or another secure electronic connection. Thus, the designated domain name ownership manager may possess a High Assurance certificate for authenticating the entity and ensuring that all communications with the designated ownership manager are authenticated and non-repudiable. Another embodiment includes an email validation process that can allow for an efficient way for a domain owner to provide updated information to the authentication registry with minimal inconvenience.

Based on the Who Is information 620, the domain information 630, and the domain authentication information 640 received via the user interface 635, the validation process can determine validity of the domain name. An indication of validity or invalidity such as a flag, marker, score, etc. can then be stored in the registration database 407 of the authentication registry as discussed above. Furthermore, this indication of validity or invalidity can be provided to the reputation service 420 to be stored in or associated with reputation information 610 for the domain name as discussed above. According to one embodiment, the indication of validity or invalidity as well as Who Is information 620, domain information 630, and/or domain authentication information 640 can be provided to the reputation service via a protocol 645 such as, for example XML, depending upon the reputation service 420.

Also as noted above, the validation process 408e can continue to monitor these domain names for changes. Upon detecting a change in the Who Is information 620 and/or domain information 630 or upon the domain owner providing updated information, the validation process 408 can re-validate the domain name ownership and, if a change has occurred, update the indication of validity or invalidity in the registration database 407 and update or notify the reputation service 420.

One skilled in the art may note that there are a number of security issues and availability concerns that should be addressed in conjunction with validating and presenting domain name ownership as described herein. These issues and approaches to addressing each are now described.

Monitoring for Changes to Domain Ownership and Revocation

As described above and in the Related Applications, zone file changes can be monitored in real time for the .com and .net registries. Changes to a validated domain name ownership record can be detected and the "validated" status in the reputation service and/or registration database could be revoked upon an unexpected change in ownership or in the "thin" whois record. Embodiments of the present invention can also monitor for any change to the "thick" whois record via negotiated access to the whois records of domain registrars.

Registrars who do not provide reliable access, as mandated by ICANN to peer registrars, may not then be eligible to have domain names verified and reported. Generally, providing such access is not an issue between the small number of first tier registrars who represent most well-known corporation and IP rights holder, or even most retail registrars. Registrars such as those who cater to cybersquatters and fraudsters do block such whois access. Therefore, domains registered with such registrars may not be eligible for "validation". As such, one side benefit to enabling validated domain name reporting via the reputation service and client browser can be that it will tend to cause more registrars to follow ICANN rules related to maintaining accurate domain name ownership records. Moreover, this close attention to the behaviors of hundreds of registrars can be leveraged by a domain reputation database for use by the reputation service, spam filters, and search engines.

Preventing DNS Poisoning and Pharming

It should be noted that DNS poisoning (popularly known as pharming) is complex, high-cost and low-return way to conduct a phishing type attack. Given that phishers are predominately economically motivated, there are few instances of this type of attack. Nonetheless, it is important to prevent pharming, if only to avoid the publicity of a successful attack conducted by hackers more for publicity or their own reputation.

There are several ways to prevent to monitor for DNS poisoning or pharming attacks. The first is to protect the authoritative domain name servers for the validated domain names. This can be done by monitoring the Internet root servers to ensure that they are pointing to the correct authoritative domain name servers. Then, the correct authoritative name servers should be monitored to ensure they match an expected IP address (either specific or within a defined and know range) for each "validated" domain name. The above is greatly simplified if the domain customer uses the authentication service to provide an authoritative DNS service.

In addition, the DNS caching servers owned or used by ISPs that provide Internet access to consumers or are commonly used to update corporate DNS caching servers can be monitoring to ensure that they are accurate, and have not been poisoned. Furthermore, most large security firms monitor for DNS "flutter", which indicates DNS poisoning and their cooperation and services could be incorporated to protect this solution. Other methods for providing an anti-pharming monitoring and response service that protects consumers who use the largest consumer ISPs are described in the Related Applications. These solutions can be expanded globally to protect this service from DNS poisoning.

Preventing Man-in-the-Middle Attacks

One enabler to presenting validated domain ownership or certificate ownership information securely is that the communications between the reputation service and the reporting fields in the client browser that are "within the chrome" are inherently secure and authenticated. However, it is important to prevent a fraudster from leveraging consumer trust related to domain ownership "within the chrome" to give false credence to frames presented within the browser's presentation window. This can be accomplished by multiple means, including enforcing same origin or designated origin policies for frames presented in association with a "validated" domain name, as well as extending the use of "validated" domains to such things as portable "inside the chrome" data entry and logo objects that are called by a URL containing the "validated" domain and whose ownership can be reported in the pop-up owner window.

Addressing Latency in Reputation Service to Browser Communications

Latency is not a security issue, per se, but it is an availability issue that could cause consumers to not use a reputation service enabled browser in favor or non-enabled systems. This issue would apply equally to providing ownership information about certificates as it would to providing the ownership information about domains.

Once a customer has signed up for "validated" domain names, their portfolio would tend to remain fairly constant with only occasional additions and deletions. This would lend itself to a secure client-side caching model. Part of the value of strong validation of ownership is that the need for sudden revocation is minimized, and this can be enhanced by with multi-year subscriber signup. In addition, embodiments of the present invention can include a fixed set of entity, geography and language hierarchies, such that multiple validated domain names can have one or a small number of owner records thereby further limiting the amount of information to be cached locally.

According to one embodiment, other "fixed" reputation categories of domain names can be provided. These categories can include names that are: "validated", have statistically good reputations, unknown reputations, statistically bad reputations, known to be involved in fraud, etc. based on such things as proven fraud, trusted registrar, etc. Such categories can decrease the amount of event driven communications between the client browser and the reputation service. However, at some point, the reputation service may be distributed globally and associated with geo-location and edge caching/edge computing solutions. These can enable more advanced validated "ownership" solutions, such as those described below.

For example, once it is possible to deliver secure text "within the chrome" in association with a validated domain name, the same model can be extended to enable corporations and others to delegate "validated" rights related to the use of their IP assets such as names, logos, URL, stock photography, compositions or any other digital assets or secure objects such as data input forms. In other words, a consumer can mouse over the icon to the right of the domain name to return a valid ownership record (or other visual indicators of ownership like a logo). Similarly, the reputation service and its secure communications capability to the browser can be used to produce the same ownership record when a consumer mouses over a valid URL, corporate logo or other commonly understood and well marketed symbol of ownership. This feature may use, for example, secure features of the client's browser (as well as digital assets programming objects) to extend the secure "inside the chrome" protections of the browser to special types of frame objects that operate as if they were inside the chrome ("portable chrome") and in conjunction with secure and authenticated communications to the reputation service.

This IP and digital rights delegation and communications system can help to provide a consistent user experience in determining valid rights ownership. Thus, consumers can easily learn that the same "owner" information window that pops up when they mouse over the icon to the right of a "validated" domain name in the address field to confirm ownership, will pop up if they mouse over the same a URL link that includes the "validated" domain name within a browser window (or an URL within another application), or a logo called by the "validated" domain name, or a protected data entry field called by a "validated" domain name, etc. Therefore, consumers only need to learn one behavior and to interpret one consistent set of ownership data to validate a long list of symbols and internet computing objects that require knowledge of ownership.

To be clear, fraudsters will still be able to link inappropriately to rights owners and to fake their logos. However, consumers will learn that the ownership record will pop up if the URL or logo is associated with a "validated" rights owner and will not pop up if is not associated with a "validated" rights owner.

IP rights requesters, such as legitimate resellers, can easily request approval to include these "validated" domains (bound to the use of specific URLs, logos, data input objects, etc. called by "validated" domains, etc.) in their website (or emails, etc.) by obtaining approval from the designed domain manager who is authorized by the validation process described above to make changes to the domain owner's ownership records (including changes related to delegating ownership rights). This model is much cleaner and more extensible then trying to incorporate and maintain IP rights requesters in rigid certificate hierarchies.

Currently, the overwhelming majority of web pages are not secured by SSL certificates, including most corporate home pages, which often include data entry fields for credential, financial and other identity information. Furthermore, HTTP is not going to be replaced by HTTPS everywhere, much less high assurance certificates. Consumers would be much safer if they had a consistent way to know ownership of "validated" domains for HTTP sessions, which make up the vast majority of web pages in the Internet, including most home pages. In many cases the data input fields for credential and other personal identity data are on plain HTTP pages, such that a consumer can easily be tricked into providing this data before they enter an HTTPS session. Additionally, high availability certificates may incorporate a higher standard of ownership validation than today's certificate, but this is a clumsy after the fact approach and it will be hard to educate consumers as to the fine points of knowing to look to these certificates for reliable ownership identity and conversely not to trust other certificates.

According to one embodiment, "validated" domain names can be used to enable consumers to know the owner of the domain (and the data entry field frame), before entering to a secure SSL certificate enabled HTTP session. Thus, one ownership presentation standard tied to "validated" domain names, can apply uniformly and consistently to HTTP, HTTPS and to other objects in the Internet where consumers require simple ownership information. In fact, providing a consistent means of presenting "validated" ownership, removes consumer education barriers to the use of high-assurance certificates because it would be possible to use "validated" domain names in place of high assurance certificates. If the consumer can view ownership information, they automatically get the protection of high-assurance certificates.

According to another embodiment, tracking ownership of "validated" domain names (and name groups) makes it possible to inform or warn a consumer that that they have been redirected to an entity outside the "validated" domain group. Certificates enable these "secure" external redirections to subsidiaries and trading partners, but consumers are left unaware that "ownership" has changed. Reporting every "ownership" change would be cumbersome, but this could be managed by setting up "ownership" vouching hierarchies and the ability to vouch for external "validated" domain names, or not. At a minimum, the system might want to alert a consumer if they have been redirected to a domain name not that has not been vouched for and is not "validated".

Figure 7:
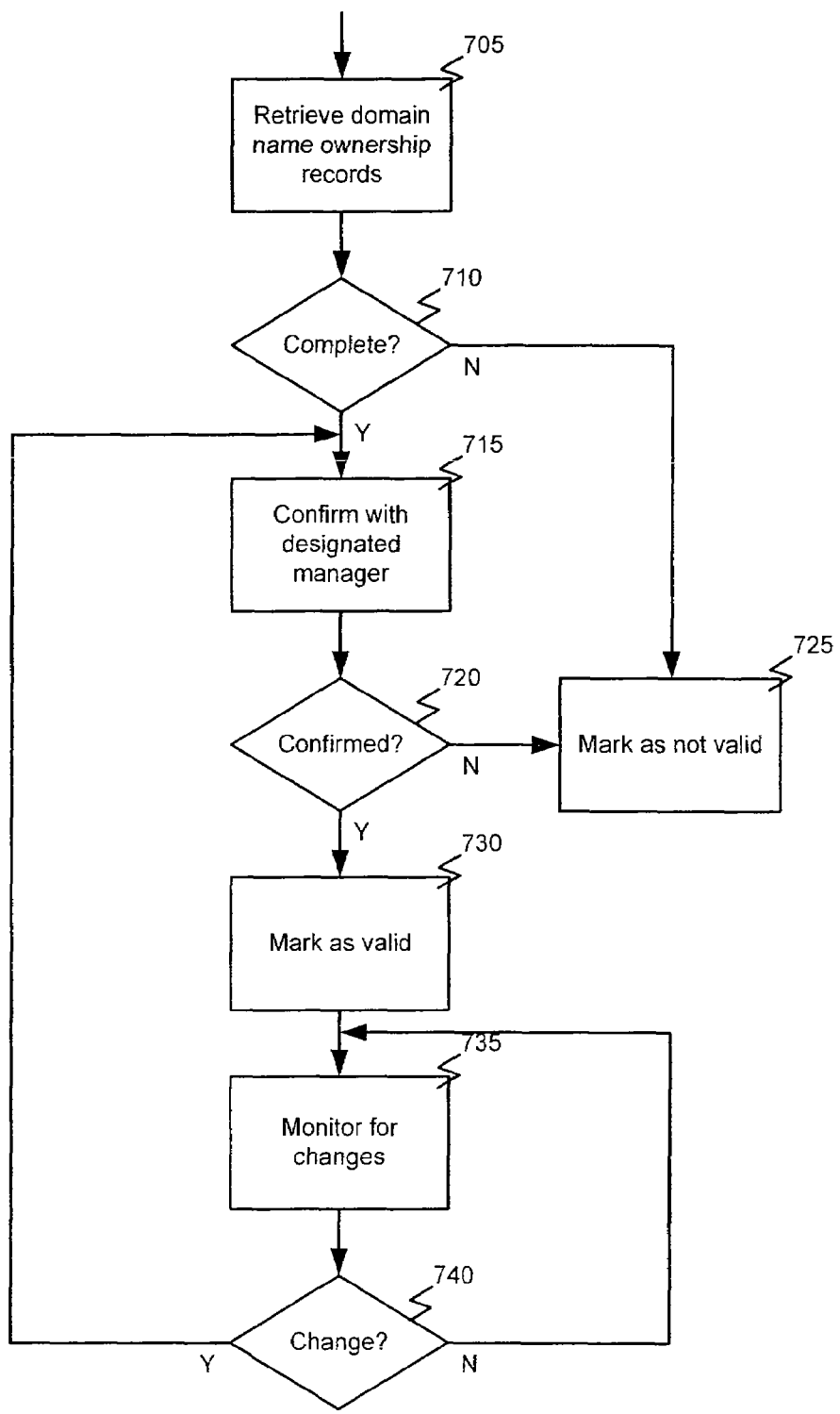
FIG. 7 is a flowchart illustrating a process for validating domain name ownership according to another embodiment of the present invention.

FIG. 7 is a flowchart illustrating a process for validating domain name ownership according to another embodiment of the present invention. This process is exemplary of a process that may be implemented by validation process 408 described above and used in conjunction with any of the security and/or rights management features discussed herein. In this example, the process begins with retrieving 705 one or more domain name ownership records. As noted above, the one or more domain name ownership records can comprise, for example, Who Is or other records.

A determination 710 can be made as to whether the one or more domain name ownership records are substantially complete. In response to determining 710 the one or more domain name ownership records are not complete, the domain can be marked 725 as not valid. That is, a record or other information related to the domain name and maintained by the authentication registry can be flagged or otherwise marked to indicate invalidity, or at least lack of validation, of the domain name. According to one embodiment, a validity score can be set based on the completeness or lack thereof of the ownership records.

In response to determining 710 the one or more domain name ownership records are complete, validity of the one or more domain name records can be confirmed 715 with a designated domain manager. That is, the designated domain manager can be contacted via secure email or other secure means with a request to confirm the registration information. Therefore, confirming validity of the one or more domain name records with the designated domain manager can comprise authenticating the designated domain manager based on a certificate provided by the designated domain manager.

In response to not confirming 720 validity of the one or more domain name records or receiving a negative indication from the domain manager, the domain can be marked 725 as invalid. That is, a record or other information related to the domain name and maintained by the authentication registry can be flagged or otherwise marked to indicate invalidity, or at least lack of validation, of the domain name. According to one embodiment, a validity score can be set based on the response from the domain manager.

In response to confirming 720 validity of the one or more domain name records or receiving a positive response from the domain manager, the domain can be marked 730 as valid. Again, a record or other information related to the domain name and maintained by the authentication registry can be flagged or otherwise marked to indicate validity of the domain name. According to one embodiment, a validity score can be set based on the response from the domain manager.

The one or more domain name ownership records can then be monitored 735 for changes on an ongoing basis. That is, the domain name ownership records can be checked periodically or upon the occurrence of some event. Thus, changes in the one or more domain name ownership records can be detected 740. In response to detecting 740 the change in the one or more domain name ownership records, the domain name can be re-validated 715.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for validating ownership of a domain name, the method comprising:
    retrieving one or more domain name ownership records;
    confirming validity of the one or more domain name ownership records with a designated domain manager;
    in response to confirming validity of the one or more domain name ownership records, marking the domain as valid;
    monitoring the one or more domain name ownership records;
    in response to a change in the one or more domain name ownership records, re-validating ownership of the domain name;
    receiving a request from a web browser of a client system to verify a web site;
    verifying the web site based on a domain of the web site being marked as valid; and
    reporting results of verifying the web site to the web browser.

2. The method of claim 1, wherein the one or more domain name ownership records comprise Who Is records.

3. The method of claim 1, further comprising, prior to confirming validity of the one or more domain name ownership records, determining whether the one or more domain name ownership records are substantially complete.

4. The method of claim 3, wherein confirming validity of the one or more domain name ownership records is performed in response to determining the one or more domain name ownership records are complete.

5. The method of claim 3, further comprising, in response to determining the one or more domain name ownership records are not complete, marking the domain as not valid.

6. The method of claim 1, wherein confirming validity of the one or more domain name ownership records with the designated domain manager comprises authenticating the designated domain manager based on a certificate provided by the designated domain manager.

7. The method of claim 1, further comprising, in response to not confirming validity of the one or more domain name ownership records, marking the domain as invalid.

8. The method of claim 1, wherein monitoring the one or more domain name ownership records comprises periodically crawling one or more web sites containing the one or more domain name ownership records.

9. The method of claim 1, wherein re-validating ownership of the domain name comprises:
    re-confirming validity of the one or more domain name ownership records with the designated domain manager based on the change in the one or more domain name ownership records; and
    marking the domain as valid or invalid based on re-confirming validity of the one or more domain name ownership records.

10. A system comprising:
    a processor; and
    a memory communicatively coupled with and readable by the processor and containing therein instructions which, when executed by the processor, cause the processor to retrieve one or more domain name ownership records, confirm validity of the one or more domain name ownership records with a designated domain manager, in response to confirming validity of the one or more domain name ownership records, mark the domain as valid, monitor the one or more domain name ownership records, re-validate ownership of the domain name in response to detecting a change in the one or more domain name ownership records, receive a request from a web browser of a client system to verify a web site, verify the web site based on a domain of the web site being marked as valid, and report results of verifying the web site to the web browser.

11. The system of claim 10, wherein the one or more domain name ownership records comprise Who Is records.

12. The system of claim 10, further comprising, prior to confirming validity of the one or more domain name ownership records, determining whether the one or more domain name ownership records are substantially complete.

13. The system of claim 12, wherein confirming validity of the one or more domain name ownership records is performed in response to determining the one or more domain name ownership records are complete.

14. The system of claim 12, further comprising, in response to determining the one or more domain name ownership records are not complete, marking the domain as not valid.

15. The system of claim 10, wherein confirming validity of the one or more domain name ownership records with the designated domain manager comprises authenticating the designated domain manager based on a certificate provided by the designated domain manager.

16. The system of claim 10, wherein confirming validity of the one or more domain name ownership records with the designated domain manager comprises authenticating the designated domain manager based on the verification of one or more elements of the domain name ownership record.

17. The system of claim 10, wherein confirming validity of the one or more domain name ownership records with the designated domain manager comprises receiving confirmation from the domain owner about the validity of the information in the domain name ownership record.

18. The system of claim 10, further comprising, in response to confirming validity of the one or more domain name ownership records, marking the domain as valid.

19. The system of claim 10, further comprising, in response to not confirming validity of the one or more domain name ownership records, marking the domain as invalid.

20. The system of claim 10, wherein monitoring the one or more domain name ownership records comprises periodically crawling one or more web sites containing the one or more domain name ownership records.

21. The system of claim 10, wherein re-validating ownership of the domain name comprises:
re-confirming validity of the one or more domain name ownership records with the designated domain manager based on the change in the one or more domain name ownership records; and
marking the domain as valid or invalid based on re-confirming validity of the one or more domain name ownership records.

22. A machine-readable medium having stored thereon a series of executable instructions which, when executed by a processor, cause the processor to validate ownership of a domain name by:
retrieving one or more domain name ownership records;
confirming validity of the one or more domain name ownership records with a designated domain manager;
in response to confirming validity of the one or more domain name ownership records, marking the domain as valid;
monitoring the one or more domain name ownership records;
in response to a change in the one or more domain name ownership records, re-validating ownership of the domain name;
receiving a request from a web browser of a client system to verify a web site;
verifying the web site based on a domain of the web site being marked as valid; and
reporting results of verifying the web site to the web browser.

23. The machine-readable medium of claim 22, wherein the one or more domain name ownership records comprise Who Is records.

24. The machine-readable medium of claim 22, further comprising, prior to confirming validity of the one or more domain name ownership records, determining whether the one or more domain name ownership records are substantially complete.

25. The machine-readable medium of claim 24 wherein confirming validity of the one or more domain name ownership records is performed in response to determining the one or more domain name ownership records are complete.

26. The machine-readable medium of claim 24, further comprising, in response to determining the one or more domain name ownership records are not complete, marking the domain as not valid.

27. The machine-readable medium of claim 22, wherein confirming validity of the one or more domain name ownership records with the designated domain manager comprises authenticating the designated domain manager based on a certificate provided by the designated domain manager.

28. The machine-readable medium of claim 22, further comprising, in response to confirming validity of the one or more domain name ownership records, marking the domain as valid.

29. The machine-readable medium of claim 22, further comprising, in response to not confirming validity of the one or more domain name ownership records, marking the domain as invalid.

30. The machine-readable medium of claim 22, wherein monitoring the one or more domain name ownership records comprises periodically crawling one or more web sites containing the one or more domain name ownership records.

31. The machine-readable medium of claim 22, wherein re-validating ownership of the domain name comprises:
re-confirming validity of the one or more domain name ownership records with the designated domain manager based on the change in the one or more domain name ownership records; and
marking the domain as valid or invalid based on re-confirming validity of the one or more domain name ownership records.

* * * * *